United States Patent
Terai et al.

(10) Patent No.: US 11,660,899 B2
(45) Date of Patent: May 30, 2023

(54) IRON-BASED SINTERED BODY, METHOD FOR LASER-MARKING THE SAME, AND METHOD FOR MANUFACTURING THE SAME

(71) Applicant: SUMITOMO ELECTRIC SINTERED ALLOY, LTD., Okayama (JP)

(72) Inventors: Hiroaki Terai, Okayama (JP); Masayuki Tauchi, Okayama (JP); Kenji Nawachi, Okayama (JP)

(73) Assignee: SUMITOMO ELECTRIC SINTERED ALLOY. LTD., Takahashi (JP)

( * ) Notice: Subject to any disclaimer, the term of this patent is extended or adjusted under 35 U.S.C. 154(b) by 459 days.

(21) Appl. No.: 16/755,575

(22) PCT Filed: Oct. 30, 2018

(86) PCT No.: PCT/JP2018/040311
§ 371 (c)(1),
(2) Date: Apr. 11, 2020

(87) PCT Pub. No.: WO2019/093194
PCT Pub. Date: May 16, 2019

(65) Prior Publication Data
US 2020/0262229 A1   Aug. 20, 2020

(30) Foreign Application Priority Data

Nov. 7, 2017  (JP) .............................. JP2017-214263

(51) Int. Cl.
*B23K 26/08* (2014.01)
*B23K 26/18* (2006.01)
(Continued)

(52) U.S. Cl.
CPC ............... *B41M 5/262* (2013.01); *B22F 3/24* (2013.01); *B23K 26/0665* (2013.01);
(Continued)

(58) Field of Classification Search
CPC .... B23K 26/0093; B23K 26/18; B23K 26/08; B23K 26/352; B23K 26/362;
(Continued)

(56) References Cited

U.S. PATENT DOCUMENTS 4,939,354 A * 7/1990 Priddy ............. G06K 19/06037
235/494
5,061,341 A * 10/1991 Kildal .................... B23K 26/18
216/65

(Continued)

FOREIGN PATENT DOCUMENTS

JP     60-206130 A    10/1985
JP     11-238656 A    8/1999
(Continued)

OTHER PUBLICATIONS

International Search Report for corresponding Application No. PCT/JP2018/040311, dated Jan. 29, 2019.

*Primary Examiner* — Jimmy Chou
(74) *Attorney, Agent, or Firm* — Renner, Otto, Boisselle & Sklar, LLP

(57) ABSTRACT

A method for laser-marking an iron-based sintered body includes a first step of forming with a first laser beam a plurality of dotted recesses with a predetermined depth in an identification mark area of a surface of an iron-based sintered body, and a second step of flattening with a second laser beam the surface within the identification mark area other than the dotted recesses. The first laser beam has an irradiation energy per unit area greater than an irradiation energy per unit area of the second laser beam.

6 Claims, 10 Drawing Sheets

(51) Int. Cl.
*B41M 5/26* (2006.01)
*B23K 26/082* (2014.01)
*B23K 26/359* (2014.01)
*B23K 26/352* (2014.01)
*B22F 3/24* (2006.01)
*B23K 26/06* (2014.01)
*B23K 103/02* (2006.01)

(52) U.S. Cl.
CPC .......... *B23K 26/082* (2015.10); *B23K 26/359* (2015.10); *B23K 26/3576* (2018.08); *B22F 2003/245* (2013.01); *B23K 2103/02* (2018.08)

(58) Field of Classification Search
CPC ............ B23K 2103/02; B23K 26/0665; B23K 26/3576; B23K 26/359; B23K 26/082; B41J 2/435; B41M 5/0058; B41M 5/262; B22F 2003/245; B22F 3/24
See application file for complete search history.

(56) References Cited

U.S. PATENT DOCUMENTS

| | | | | |
|---|---|---|---|---|
| 5,175,774 A * | 12/1992 | Truax | B44B 7/00 | 257/E23.179 |
| 5,202,552 A * | 4/1993 | Little | G06K 19/06037 | 235/494 |
| 5,343,031 A * | 8/1994 | Yoshida | G06K 7/14 | 235/494 |
| 5,686,718 A * | 11/1997 | Iwai | G06K 19/06037 | 235/494 |
| 5,855,969 A * | 1/1999 | Robertson | B41M 5/267 | 427/556 |
| 5,862,101 A * | 1/1999 | Haas | G04F 13/04 | 368/327 |
| 6,121,574 A * | 9/2000 | Xu | G06K 15/029 | 219/121.69 |
| 6,164,552 A * | 12/2000 | Sato | G06K 1/126 | 235/494 |
| 6,218,199 B1 * | 4/2001 | Sato | H01L 23/544 | 438/18 |
| 6,372,293 B1 * | 4/2002 | Mathus | B01L 3/5453 | 235/494 |
| 6,449,123 B1 * | 9/2002 | Tsujimoto | C04B 41/53 | 360/234.3 |
| 6,479,208 B1 * | 11/2002 | Robertson | B44C 1/1716 | 430/945 |
| 6,533,181 B1 * | 3/2003 | Roxby | G06K 1/121 | 235/494 |
| 6,681,055 B1 * | 1/2004 | Sato | B41M 5/24 | 382/268 |
| 6,802,450 B2 * | 10/2004 | Cheung | G06K 19/06037 | 235/462.11 |
| 6,817,527 B2 * | 11/2004 | Hellberg | H05K 13/046 | 235/375 |
| 6,852,948 B1 * | 2/2005 | Harrison | B41M 5/262 | 219/121.85 |
| 6,866,199 B1 * | 3/2005 | Keech | H04N 1/00045 | 235/494 |
| 7,017,800 B2 * | 3/2006 | Ulrich | B23H 9/06 | 235/487 |
| 7,137,557 B2 * | 11/2006 | Kudo | H01L 24/78 | 257/E23.179 |
| 7,388,984 B2 * | 6/2008 | Reichenbach | G06K 19/06037 | 235/494 |
| 7,602,409 B2 * | 10/2009 | Sato | G06K 1/126 | 347/224 |
| 7,889,930 B2 * | 2/2011 | Long | G06V 10/993 | 382/112 |
| 8,272,038 B2 * | 9/2012 | Husemann | H04L 9/3271 | 726/16 |
| 8,366,011 B2 * | 2/2013 | Hovis | G06K 19/06037 | 235/494 |
| 8,434,690 B2 * | 5/2013 | Ushijima | G06K 19/0614 | 235/494 |
| 8,511,551 B1 * | 8/2013 | Foster | G16H 10/65 | 235/382 |
| 8,709,328 B2 * | 4/2014 | Fujita | H01J 37/32724 | 219/121.17 |
| 9,272,533 B2 * | 3/2016 | Asai | B41M 5/337 | |
| 10,005,305 B2 * | 6/2018 | Wadehn | B23K 26/361 | |
| 10,108,888 B2 * | 10/2018 | Ramsey | B65D 1/12 | |
| 10,909,432 B2 * | 2/2021 | Kanbe | G06K 19/06037 | |
| 2006/0138105 A1 * | 6/2006 | Parker | B41J 2/475 | 219/121.69 |
| 2006/0180581 A1 * | 8/2006 | Swaringen | B23K 26/04 | 700/166 |
| 2006/0243708 A1 * | 11/2006 | Ikenoue | H01L 21/76898 | 219/121.62 |
| 2006/0243713 A1 * | 11/2006 | Sato | G02B 26/10 | 219/121.68 |
| 2007/0038464 A1 * | 2/2007 | Sato | G05B 19/4183 | 358/1.17 |
| 2007/0075059 A1 * | 4/2007 | Arai | B23K 26/067 | 219/121.73 |
| 2007/0086822 A1 * | 4/2007 | Sato | B23K 26/0648 | 400/129 |
| 2008/0026319 A1 * | 1/2008 | Stroh, III | B41M 5/26 | 430/270.1 |
| 2008/0272095 A1 * | 11/2008 | Alpay | B23K 26/389 | 219/121.71 |
| 2011/0220625 A1 * | 9/2011 | Pluss | B23K 26/0823 | 219/121.72 |
| 2012/0223335 A1 * | 9/2012 | Tsuchiya | H01L 23/544 | 257/77 |
| 2013/0068737 A1 * | 3/2013 | Saito | B28D 5/00 | 219/121.72 |
| 2013/0200051 A1 * | 8/2013 | Hert | B23K 26/38 | 219/121.67 |
| 2014/0001708 A1 * | 1/2014 | Ewing | B29C 59/16 | 277/590 |
| 2014/0027412 A1 * | 1/2014 | Kato | B23K 26/02 | 219/121.61 |
| 2014/0147694 A1 * | 5/2014 | Harrison | B23K 26/354 | 219/121.66 |
| 2014/0353381 A1 * | 12/2014 | Stuck | C03C 23/0025 | 235/494 |
| 2015/0064933 A1 * | 3/2015 | Sharma | H01L 21/67115 | 438/795 |
| 2015/0352666 A1 * | 12/2015 | Fujita | B23K 26/402 | 219/121.61 |
| 2016/0034805 A1 * | 2/2016 | Ramsey | G06K 19/06046 | 219/121.85 |
| 2016/0067820 A1 * | 3/2016 | Mironets | B33Y 10/00 | 219/76.12 |
| 2016/0082549 A1 * | 3/2016 | Yoshida | B23K 26/389 | 219/121.7 |
| 2017/0021654 A1 * | 1/2017 | Bilhe | G03H 1/04 | |
| 2018/0197054 A1 | 7/2018 | Suzuki et al. | | |
| 2018/0331511 A1 * | 11/2018 | Maki | H01T 13/32 | |
| 2018/0333962 A1 * | 11/2018 | Greggio | B44C 1/228 | |
| 2019/0217388 A1 | 7/2019 | Take | | |
| 2019/0255660 A1 * | 8/2019 | Mori | B23K 26/0652 | |
| 2020/0153207 A1 * | 5/2020 | Sadaka | H01T 21/02 | |

FOREIGN PATENT DOCUMENTS

| | | |
|---|---|---|
| JP | 2001-334753 A | 12/2001 |
| JP | 2008-189956 A | 8/2008 |
| JP | 2017-14552 A | 1/2017 |
| WO | 2017002605 A1 | 1/2017 |

* cited by examiner

US 11,660,899 B2

IRON-BASED SINTERED BODY, METHOD FOR LASER-MARKING THE SAME, AND METHOD FOR MANUFACTURING THE SAME

TECHNICAL FIELD

The present disclosure relates to an iron-based sintered body, a method for laser-marking the same, and a method for manufacturing the same.

The present application is based on and claims priority from Japanese Patent Application No. 2017-214263 filed Nov. 7, 2017, the entire content of which is incorporated herein by reference.

BACKGROUND ART

PTL 1 describes a method for forming semi-spherical recesses, which are circular dots when viewed in a plan, by irradiating the surface of a silicon substrate with a laser beam to form a two-dimensional code with a matrix of light and dark patterns. PTL 2 describes a method for marking a sintered body formed from an alumina titanium carbide with identification information, by irradiating the sintered body with a laser beam to form recesses in the sintered body.

CITATION LIST

Patent Literature

PTL 1: Japanese Unexamined Patent Application Publication No. 11-238656
PTL 2: Japanese Unexamined Patent Application Publication No. 2001-334753

SUMMARY OF INVENTION

A method according to an aspect of the present disclosure is a method for laser-marking an iron-based sintered body. The method includes a first step and a second step. In the first step, multiple dotted recesses having a predetermined depth are formed with a first laser beam in an identification mark area on a surface of an iron-based sintered body. In the second step, the surface within the area other than the dotted recesses is flattened by a second laser beam. The first laser beam has an irradiation energy per unit area larger than an irradiation energy per unit area of the second laser beam.

An iron-based sintered body according to an aspect of the present disclosure includes an identification mark area at a portion of a surface, and a dotted recess that forms an identification mark is formed within the area. When a surface out of the identification mark area serving as an outer circumference of the identification mark area is used as a reference height, the recess has a depth of greater than or equal to 70 μm and smaller than or equal to 200 μm, and a protrusion having a height of greater than or equal to 0 μm and smaller than or equal to 300 μm is disposed at an outer periphery of the recess.

DESCRIPTION OF EMBODIMENTS

Figure 1:
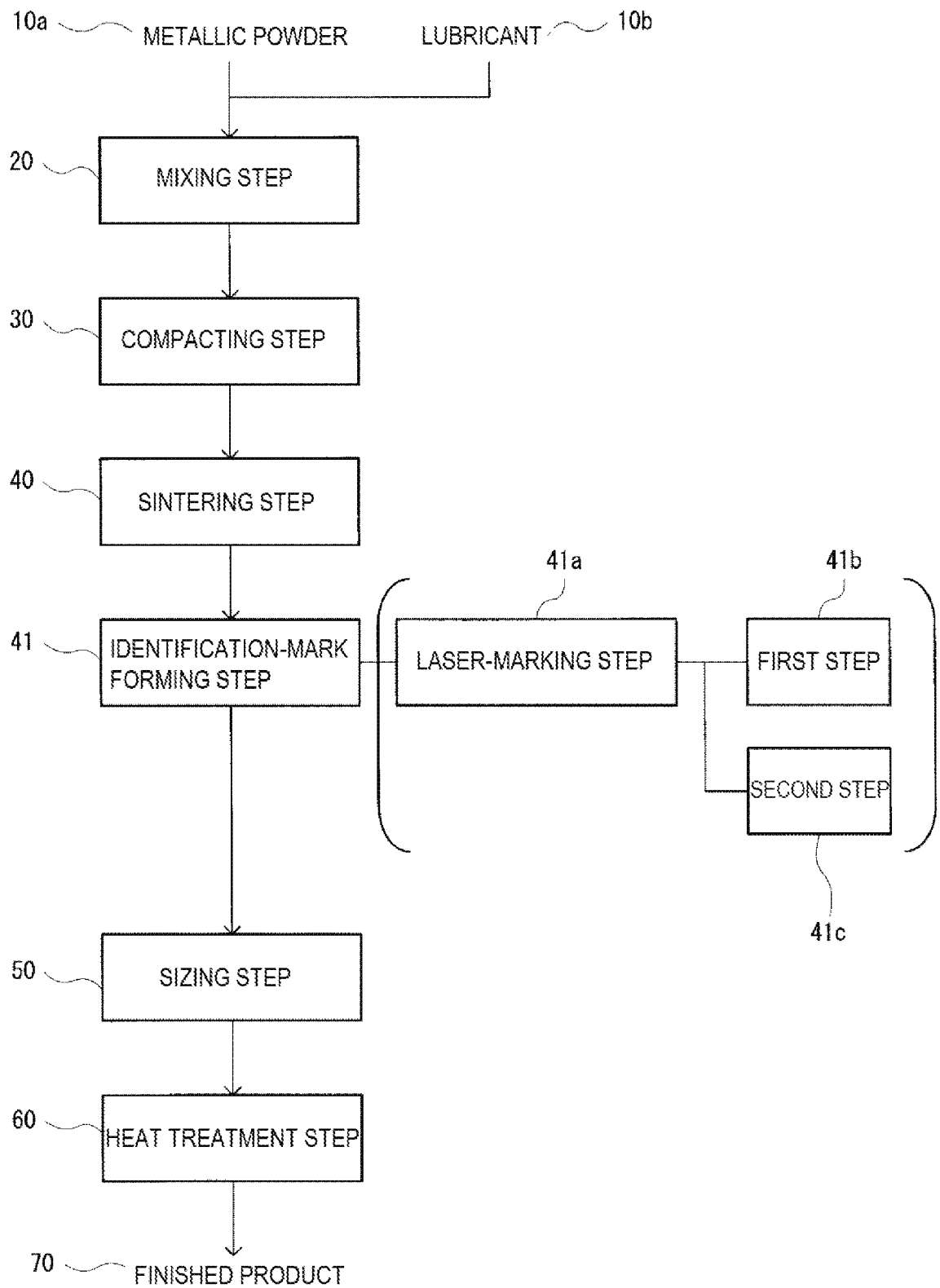
FIG. 1 is a flowchart illustrating steps of manufacturing an iron-based sintered body according to an embodiment of the present disclosure.

Problems to be Solved by Present Disclosure

Inventors have studied a method for forming an identification mark including a two-dimensional code, for product shipment information management, on a sintered body made of a metallic powder by directly irradiating the surface of the sintered product with a laser beam using, for example, a commercially available laser-marker device at a sintered-product factory of the inventors.

A method for forming an identification mark on, for example, a product by irradiating the product with a laser beam (hereinafter referred to as a "laser-marking method") involves forming multiple dotted recesses on a predetermined surface with a laser energy. When these dotted recesses can be used as dark portions and other portions can be used as light portions to form clear contrast, they can be used as identification information such as a two-dimensional code.

One of the most important qualities required for an identification mark is that a formed dot is reliably read by, for example, a code reader (hereinafter referred to as "legibility"). If the contrast between the dark portions and the light portions for accurately recognizing the dot positions is not clear, more specifically, if the dotted portions intended to serve as dark portions are bright or the portions intended to serve as light portions are dark, the code reader fails to recognize these dots.

When an identification mark is illegible or erroneously read, collected data or information is missed. This data missing impairs the reliability or safety of a management system in shipment product management, production management, traceability, or quality/process management, so that the production line fails to attain its original target or exert its function.

Thus, the identification mark is required to stably have a high quality, that is, a legibility of 100% or extremely close to 100%.

A known method for laser-marking a sintered body made of metallic powder containing an iron-based material (hereinafter simply referred to as an "iron-based sintered body") is a method for forming recesses having a predetermined depth and outer diameter by irradiating a portion where dots are to be formed with a laser beam having a predetermined energy using, for example, a commercially available laser-marker device.

However, the legibility of identification marks formed by a known method has room for improvement.

The iron-based sintered body is formed by firmly coupling particles of an iron-based material together by sintering. Thus, to have recesses formed in its surface, the iron-based sintered body requires a laser beam with a larger energy than that required to form a recess in another material such as resin or silicon. Thus, volatile matter or debris occurs more frequently during processing, and redeposits on or readheres to the periphery around the processed portion.

The inventors have studied the causes that lower the legibility of identification marks on iron-based sintered bodies obtained by a known laser-marking method. The inventors have then clarified that the portions other than the dots, particularly, the outer periphery of each dot is more likely to be blackened, which makes the contrast between the dots and the other portions unclear, and the blackened dots result from the deposited and adhering matter accumulated on the outer periphery.

In view of the above-described known problems, the present disclosure aims to provide a method for laser-marking an iron-based sintered body for forming an identification mark highly legible by, for example, a code reader, a method for manufacturing the iron-based sintered body, and the iron-based sintered body.

Advantageous Effects of Present Disclosure

The present disclosure can provide a method for laser-marking an iron-based sintered body for forming an identification mark highly legible by, for example, a code reader, a method for manufacturing the iron-based sintered body, and the iron-based sintered body.

Summarization of Embodiments of Present Disclosure

Hereinbelow, the summarization of embodiments of the present disclosure is described.

(1) A method according to an embodiment of the present disclosure is a method for laser-marking an iron-based sintered body that includes a first step of forming a plurality of dotted recesses with a predetermined depth in an identification mark area of a surface of an iron-based sintered body with a first laser beam, and a second step of flattening the surface within the identification mark area other than the dotted recesses with a second laser beam. The first laser beam has an irradiation energy per unit area greater than an irradiation energy per unit area of the second laser beam.

With a laser-marking method according to an embodiment of the present disclosure, in the first step where the dotted recesses are formed in the identification mark area, volatile matter or debris that occurs during processing with a first laser beam redeposits on or readheres to a portion of the surface other than the recesses, particularly, at the outer peripheries of the recesses to accumulate. The volatile matter or debris is removed by the second laser beam to further flatten the portion of the surface other than the recesses. At this time, the irradiation energy per unit area of the second laser beam is made smaller than the irradiation energy per unit area of the first laser beam to further clarify the contrast between the recesses and a portion of the surface other than the recesses. Thus, an identification mark that is highly legible by a code reader can be formed.

(2) In the laser-marking method according to an embodiment of the present disclosure, the first step preferably includes a step of rotationally applying a plurality of times the first laser beam to an inside of a cell, which is a part of the identification mark area, from outside to inside of the cell in a circular or polygonal spiral form.

This is because rotationally applying the above laser beam multiple times can obtain substantially circular dotted recesses, so that the recesses can be clearly recognized as dark portions using the difference in light reflectance, and thus can be easily read by a code reader.

(3) In the laser-marking method according to an embodiment of the present disclosure, the first laser beam preferably has an irradiation energy per unit area of greater than or equal to 1.0 $J/mm^2$ and smaller than or equal to 7.0 $J/mm^2$. The second laser beam preferably has an irradiation energy per unit area of greater than or equal to 0.05 $J/mm^2$ and smaller than or equal to 0.50 $J/mm^2$.

The irradiation energy per unit area of a laser beam (unit of $J/mm^2$, hereinafter "unit" is omitted) is defined as a product obtained by multiplying irradiation time ($s/mm^2$, hereinafter referred to as "irradiation time per unit area") taken for scanning an unit area with an average output per unit spot (W) of the laser beam. The average output per unit spot is defined as a product of an energy per unit time for a CW laser, or a pulse energy (J) for a pulse laser, by a repetition frequency (I/s).

When the first laser beam has an irradiation energy per unit area of smaller than 1.0 $J/mm^2$, the recesses with an intended depth may fail to be formed. More preferably, the first laser beam has an irradiation energy per unit area of greater than or equal to 2.0 $J/mm^2$. When the first laser beam has an irradiation energy per unit area of greater than 7.0 $J/mm^2$, an excessively large amount of volatile matter or debris occurs and significantly increases redeposits or readherents, which are not preferable as being left without being fully removed by the subsequent second laser beam. More preferably, the first laser beam has an irradiation energy per unit area of smaller than or equal to 5.0 $J/mm^2$.

When the second laser beam has an irradiation energy per unit area of smaller than 0.05 $J/mm^2$, redeposits or readherents accumulated at the outer peripheries of the recesses may fail to be fully removed or prevent the surface from being fully flattened. The second laser beam more preferably has an irradiation energy per unit area of greater than or equal to 0.10 $J/mm^2$. When the second laser beam has an irradiation energy per unit area of greater than 0.50 $J/mm^2$, the portion of the surface other than the recesses may be blackened, and the portion supposed to be a light portion may be blackened, which prevents distinction between itself and the recesses formed with the first laser beam and is thus not preferable. The second laser beam more preferably has an irradiation energy per unit area of smaller than or equal to 0.30 J/mm².

(4) In the laser-marking method according to an embodiment of the present disclosure, the first laser beam has an average output per unit spot of greater than or equal to 20 W and smaller than or equal to 50 W, a spot diameter of greater than or equal to 0.010 mm and smaller than or equal to 0.060 mm, and a scanning speed of higher than or equal to 250 mm/s and lower than or equal to 320 mm/s. The second laser beam has an average output per unit spot of greater than or equal to 10 W and smaller than or equal to 25 W, a spot diameter of greater than or equal to 0.010 mm and smaller than or equal to 0.060 mm, and a scanning speed of higher than or equal to 1700 mm/s and lower than or equal to 3000 mm/s.

When the average output per unit spot of a laser beam is denoted with p, the spot diameter is denoted with r, the scanning speed is denoted with v, the irradiation time per unit area is denoted with t, and the irradiation energy per unit area is denoted with e, the relationship between these parameters are expressed with the following formula:

$$e = p \times t \quad \text{(Formula 1)},$$

where $t = 1/(r \times v)$, and $$e = p/(r \chi v) \quad \text{(Formula 2)}.$$

From Formula 2, the range of the value e is determined by the values p, r, and v. Thus, preferable ranges of p, r, and v required to achieve a preferable range of e are defined.

When the first laser beam has an average output per unit spot p of smaller than 20 W, a recess having an intended depth may fail to be formed due to insufficient power, and thus the first laser beam having such an average output is not preferable. The first laser beam more preferably has an average output per unit spot p of greater than or equal to 30 W. When the first laser beam more preferably has an average output per unit spot p of greater than 50 W, an amount of volatile matter or debris increases excessively due to excessive power, so that the first laser beam significantly increases and may fail to fully remove redeposits or readherents with the subsequent second laser beam. Thus, the first laser beam having such an average output is not preferable. The first laser beam more preferably has an average output per unit spot p of smaller than or equal to 40 W.

When the second laser beam has an average output p of smaller than 10 W, redeposits or readherents accumulated at the outer peripheries of the recesses may fail to be removed due to insufficient power. The second laser beam having an average output p of smaller than 10 W is neither appropriate nor preferable for flattening the surface. The second laser beam more preferably has an average output p of greater than or equal to 13 W. When the second laser beam has an average output p of greater than 25 W, the portion other than the recesses may be blackened due to excessive power, and prevent distinction between itself and the dots formed with the first laser beam. Thus, the second laser beam having such an average output p is not preferable. The second laser beam more preferably has an average output p of smaller than or equal to 20 W.

When the first laser beam has a scanning speed v of lower than 250 mm/s, volatile matter or debris may significantly increase due the low speed. The first laser beam having such a scanning speed v is not preferable. The first laser beam more preferably has a scanning speed v of 270 mm/s. When the first laser beam has a scanning speed v of higher than 320 mm/s, a recess having an intended depth may fail to be formed due to the high speed. Thus, the first laser beam having such a scanning speed v is not preferable. The first laser beam more preferably has a scanning speed v of lower than or equal to 300 mm/s.

When the second laser beam has a scanning speed v of lower than 1700 mm/s, the portion other than the recesses may be blackened due to the low speed, which prevents distinction between itself and the recesses formed with the first laser beam. Thus, the second laser beam having such a scanning speed v is not preferable. The second laser beam more preferably has a scanning speed v of 2000 mm/s. When the second laser beam has a scanning speed v of higher than 3000 mm/s, the second laser beam may fail to fully remove redeposits or readherents accumulated on the outer peripheries of the recesses with the subsequent second laser beam due to the high speed. Thus, the second laser beam having such a scanning speed v is not preferable. The second laser beam more preferably has a scanning speed v of lower than or equal to 2700 mm/s.

When the first laser beam has a spot diameter r of smaller than 0.010 mm, the irradiation energy e per unit area increases, as in Formula 2, due to the small spot diameter r, so that volatile matter or debris may significantly increase. When the spot diameter r is greater than 0.060 mm, the irradiation energy e per unit area decreases, and the recess having an intended depth may fail to be formed. Thus, such a spot diameter r is not preferable.

When the second laser beam has a spot diameter r of smaller than 0.010 mm, the irradiation energy e per unit area increases, and the portion of the surface other than the recesses may be blackened. Thus, the second laser beam having such a spot diameter r prevents distinction between the portion and the recesses formed with the first laser beam. When the second laser beam has a spot diameter r of 0.060 mm, the irradiation energy e per unit area decreases. The second laser beam thus may fail to fully remove the redeposits or readherents accumulated at the outer peripheries of the recesses, and is not preferable.

(5) A method for manufacturing an iron-based sintered body according to an aspect of the present disclosure includes a step of forming a first identification mark in a first area of a surface of a compact, and a step of forming a second identification mark in a second area of a surface of a sintered body obtained by sintering the compact. The second identification mark is formed by the laser-marking method according to an aspect of the present disclosure.

Specifically, providing an identification mark to each of the compact and the sintered body enables management such as quality management or step management for each of the steps from a semi-finished product to a finished product and each of the products. When the first identification mark formed on the surface of the compact is clearly left without being lost until a finished product is complete, there is no need to form a second identification mark. However, after a sintering step at a temperature of higher than or equal to 1000° C., the first identification mark may be lost or blurred. In such a case, a second identification mark needs to be additionally formed after sintering. When the second identification mark is formed by a laser-marking method according to an embodiment of the present disclosure, the identification mark can be secured to be high legible by, for example, a code reader after the sintering step.

(6) A method for forming the first identification mark is preferably a laser-marking method. The laser-marking method can form an identification mark on a compact that is highly legible by, for example, a code reader, and can prevent the identification mark from being lost after a sintering step. Even when the first identification mark is not completely lost after sintering, the first identification mark may be blurred, or another identification information may be needed for display for another purpose. In such a case, a second identification mark may be formed.

(7) In the method for manufacturing an iron-based sintered body, the method for forming the first identification mark includes a 1-1 step of forming with a third laser beam a plurality of dotted first recesses with a predetermined depth in the first area of a surface of the compact, and a 1-2 step of flattening with a fourth laser beam a surface of the first area other than the dotted first recesses. An irradiation energy per unit area of the third laser beam is preferably greater than an irradiation energy per unit area of the fourth laser beam.

Specifically, more preferably, a laser-marking method for forming the first identification mark on a compact is the same as a method for laser-marking an iron-based sintered body according to an aspect of the present disclosure. Thus, an identification mark that has high code-reader legibility when formed on a compact and that is prevented from being lost or blurred after sintering can be formed.

(8) An iron-based sintered body according to an embodiment of the present disclosure is an iron-based sintered body that includes an identification mark area in a part of a surface. A dotted recess that forms an identification mark is formed in the identification mark area. When a surface out of the identification mark area and forming an outer periphery of the identification mark area is determined as a reference height, the recess has a depth of greater than or equal to 70 μm and smaller than or equal to 200 μm, and a protrusion having a height of higher than or equal to 0 μm and lower than or equal to 300 μm is disposed at an outer periphery of the recess. The protrusion having a height of higher than or equal to 0 μm includes a case of a height of 0 μm, that is, a case where no protrusion is included.

The identification mark is formed from the recess, serving as a dark portion, and a portion of the surface other than the recess, serving as a light portion. The recess has a predetermined depth and the protrusion at the outer periphery of the recess has a predetermined height, and thus the contrast between dark and light portions can be enhanced and the code-reader legibility can be improved.

The recess, when having a depth of smaller than 70 μm, has its darkness inconspicuous. When the recess has a depth of greater than 200 μm, the outer periphery of the recess is also blackened by deposits or adherents, and such a recess is not preferable. When the protrusion at the outer periphery of the recess has a height of greater than 300 μm, the peripheral portion of the recess is also blackened and the dot fails to be clearly recognized as a dark portion. Thus, such a protrusion is not preferable.

(9) The recess preferably has an opening end with a circular shape when viewed in a plan, and a side wall preferably has a curved shape with an opening diameter monotonously decreasing toward a bottom. Here, the circular shape here means substantially circular having a wider concept including a substantially polygonal shape with unclear angles and indefinite shapes, instead of a perfect circle in a strict sense.

Thus, the recess is stabled as a dark portion, and the code-reader legibility is thus stabled.

Detailed Embodiments of Present Disclosure

Specific examples of a method for laser-marking an iron-based sintered body and a compact, a method for measuring the recess and a protrusion, a method for evaluating the legibility with a code reader, and steps of manufacturing of an iron-based sintered body according to the present embodiment will be described below in details with reference to the drawings.

Unless particularly noted, the drawings are schematic diagrams for clarifying the description. For example, the size and positional relationships of components are exaggerated or illustrated with easy-to-see ratios. The components denoted with the same reference signs throughout multiple drawings denote the same portions or components. For the purpose of reference or illustration convenience of the drawings, the terms relating to the vertical and lateral directions or positional relationships are used as appropriate. These terms, however, are merely used for facilitating the understanding of the present disclosure, and are not intended to limit the technical scope of the present disclosure.

Identification Mark of Iron-Based Sintered Body and Method for Laser-Marking the Same FIG. 1 is a flowchart illustrating steps of manufacturing an iron-based sintered body according to an embodiment of the present disclosure.

The manufacturing steps from the material to a finished product of an iron-based sintered body mainly include a mixing step 20 of adding a lubricant 10*b* to a metallic powder 10*a*, a compacting step 30 of forming a compact, a sintering step 40 of sintering the compact, an identification-mark forming step 41 of forming an identification mark on the obtained sintered body, and a sizing step 50 and a heat treatment step 60 of subsequently compressing the sintered body again to enhance the dimensional accuracy.

Here, the identification-mark forming step 41 specifically includes a laser marking step 41*a*, which includes a first step 41*b* of using a first laser beam and a second step 41*c* of using a second laser beam. The identification-mark forming step 41 is most preferably performed immediately after the sintering step 40. Instead, the identification-mark forming step 41 may be performed after the sizing step 50 or the heat treatment step 60 depending on the purpose of use.

Figure 2A:
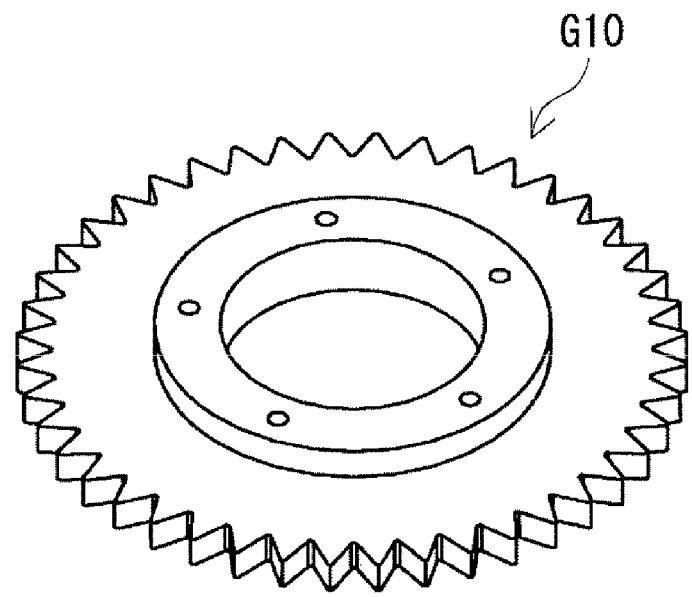
FIG. 2A is a perspective view of an iron-based sintered body before having an identification mark.
Figure 2B:
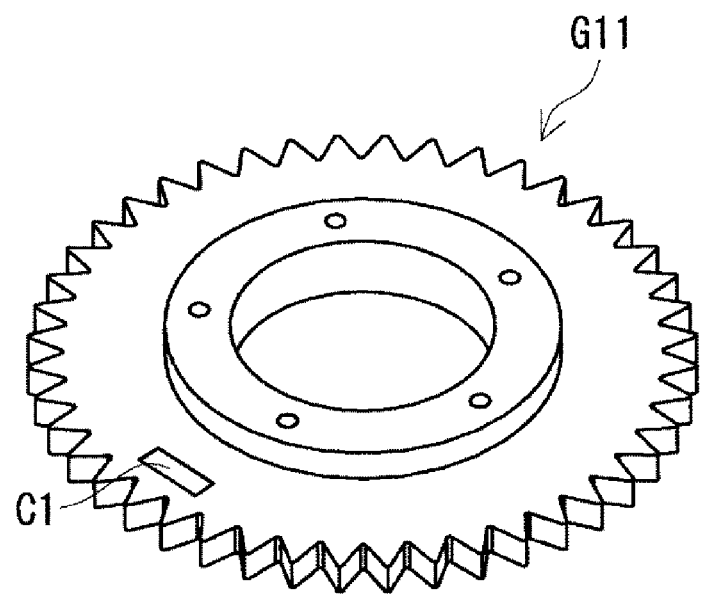
FIG. 2B is a perspective view of an iron-based sintered body having an identification mark.

FIG. 2A is a perspective view of an iron-based sintered body G10 before having an identification mark, and FIG. 2B is a perspective view of an iron-based sintered body G11 having an identification mark C1. Each of the iron-based sintered bodies G10 and G11 has a surface that allows an identification mark to be formed thereon. Here, a sprocket is illustrated as an example of the sintered product, but another product may be used instead of a sprocket.

One of the features of a laser-marking method according to the present embodiment is that the identification mark C1 is formed on the surface of the iron-based sintered body G11 after being subjected to the sintering step. Examples of an identification mark include simple numbers or signs, a one-dimensional code, such as a bar code, and a two-dimensional code or a QR code (where "QR code" is a registered trademark) such as a data matrix code. In view of maximum reduction of the size and the range of an identification mark for each product, an identification mark formed from a two-dimensional code is used as the identification mark C1 according to the present embodiment.

Figure 3:
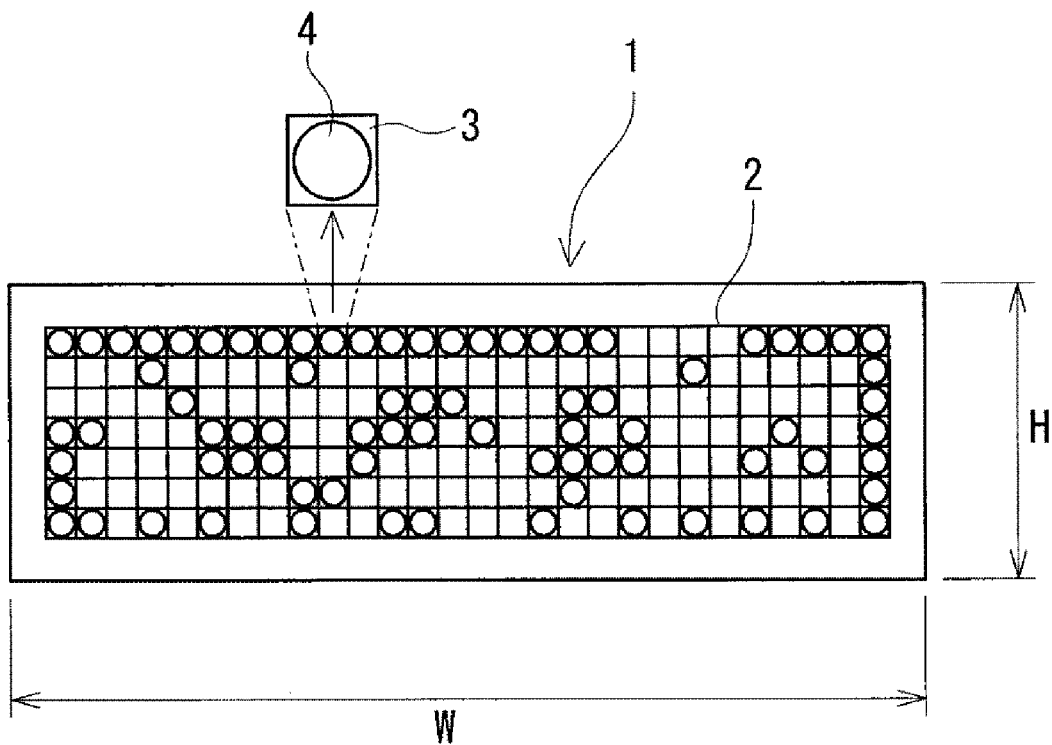
FIG. 3 illustrates an aspect of an identification mark according to the present embodiment.

FIG. 3 illustrates an aspect of the identification mark C1 according to the present embodiment. A two-dimensional code 2 is disposed within an identification mark area 1 on the surface of the iron-based sintered body. Specifically, the size of the identification mark area 1 is equivalent to or larger than the size of the two-dimensional code 2. The two-dimensional code 2 is an assembly of multiple cells 3 each having a partitioned square section having a predetermined size as one unit. Inside the cells 3 at predetermined positions, recesses 4 are formed. FIG. 3 illustrates one of the multiple cells 3 in an enlarged manner and indicated with two-dot chain lines and an arrow.

The two-dimensional code 2 enables unique identification of each iron-based sintered body G11, and keeps a record of various types of historical information definable before and after the sintering step. For example, the historical information can include the product serial number, the lot number, sintering time period, temperature, and time in the sintering step, the code number of a sintering furnace, the code number of the drawing, and the code number of a factory. These types of information may be linked with, through a network on the accumulated database, information such as a compacting time period and a compacting time (date, hours, minutes, and seconds) of the previous compacting step, and the code number of a compacting device.

Examples of a laser marking device includes a commercially available laser marker and another laser processing device.

With reference to FIG. 2B, the shape of the identification mark C1 formed on the surface of the iron-based sintered body G11 (outer diameter of approximately 100 mm) is not limited to a particular one, but usually quadrangular. With reference to FIG. 3, the size of the area 1 for the identification mark C1 differs depending on the number of cells included in a code, but preferably within, for example, 2.5 mm≤H≤3.5 mm, and 8 mm≤W≤11 mm, where H denotes a height and W denotes a width.

Figure 4:
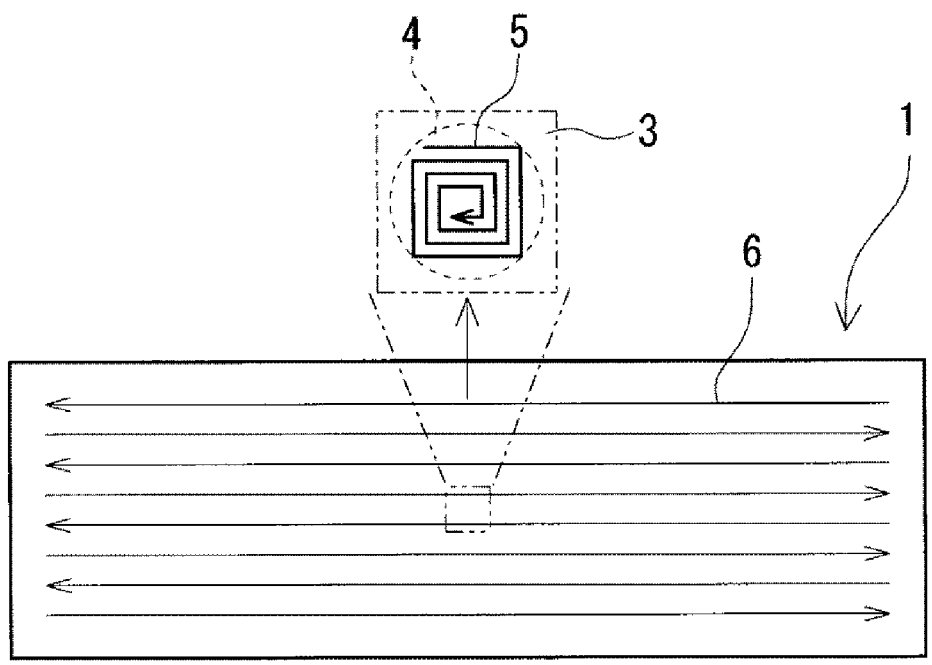
FIG. 4 is a schematic diagram of an example of scanning tracks along which first and second laser beams pass.

FIG. 4 is a schematic diagram of an example of scanning tracks of first and second laser beams. FIG. 4 corresponds to FIG. 3, and illustrates the identification mark area 1 in a lower half, and one of the cells indicated with two-dot chain lines and an arrow in an upper half. The upper half in FIG. 4 illustrates a scanning track 5 of the first laser beam inside the cell 3, and the lower half in FIG. 4 illustrates scanning tracks 6 of the second laser beam within the identification mark area 1.

With reference to the upper half of FIG. 4, in the first step, the first laser beam is applied to the cell 3 along the scanning track 5 to be spirally rotated from the outer side to the inner side of the cell inside the cell 3. Thus, the recess 4 is formed in the cell 3. More preferably, the recess 4 has a curved shape with an opening end substantially circular when viewed in a plan and a side wall having an opening diameter monotonously reducing toward the bottom. As described above, circular here means substantially circular having a wider concept including a substantially polygonal shape with unclear angles and indefinite shapes, instead of a perfect circle in a strict sense.

Here, the cell 3 is, for example, a square having each side of 150 to 270 μm. The scanning track 5 along which the first laser beam is rotationally applied preferably forms a quadrangular spiral, but may form a polygonal spiral, or a circular spiral. When a scanning with a laser beam forming one spiral track in the cell is determined as one time of rotational irradiation, the rotational irradiation is preferably performed multiple times for each cell. More preferably, the rotational irradiation is performed two or three times.

The diameter of each recess 4 is not limited to a particular diameter as long as the recess 4 is easily legible by a code reader, falls within the cell 3, and does not exert an adverse effect on an adjacent recess. Specifically, the diameter is preferably higher than or equal to 50 μm and smaller than or equal to 140 μm. The diameter of smaller than 50 μm is not preferable as the recess 4 is too small to be recognized as a dark portion by a normal code reader. The diameter of larger than 140 μm is not preferable, because redeposits or readherents caused in the first step at the outer peripheries of the recesses 4 may deposit on or adhere to the inside of adjacent recesses, and may be highly likely to exert an adverse effect on the formation of the adjacent recesses 4. The diameter is preferably greater than or equal to 70 μm, at the lowest, and smaller than or equal to 120 μm, at the largest.

With reference to the lower half of FIG. 4, in the second step, the second laser beam is linearly reciprocated along the scanning tracks 6 for scanning the entire identification mark area 1 having the recess 4.

Thus, the redeposits or readherents at the outer peripheries of the recesses 4 caused in the first step can be removed, and the portion of the surface other than the recesses 4 can be flattened.

In the present embodiment, the second laser beam is reciprocated along the scanning tracks 6 in the long side direction of the identification mark area 1. However, the direction is not limited to a particular one as long as the entirety of the identification mark area 1 can be scanned with the second laser beam. The second laser beam may be reciprocated in the short side direction, or may be repeatedly applied in the same direction instead of being reciprocated.

The second laser beam is applied to form a stripe pattern at a higher scanning speed than the first laser beam. The laser beam with a smaller spot diameter is neatly applied to more finely and smoothly finish the portion other than the recesses. Reduction of the spot diameter is limited. If the diameter is too small, the time taken for scanning increases. Thus, the spot diameter of the laser beam may be adjusted, or the processing line width or the number of lines may be determined depending on the purpose of use.

The line (stripe pattern) scanning as illustrated with the scanning tracks 6 may be used for foundation treatment of the identification mark area 1 before the first step. Such foundation treatment flattens and lightens the surface of the entire identification mark area 1 to further enhance the contrast as the light portion after the formation of the recess, which is more preferable.

Figure 5A:
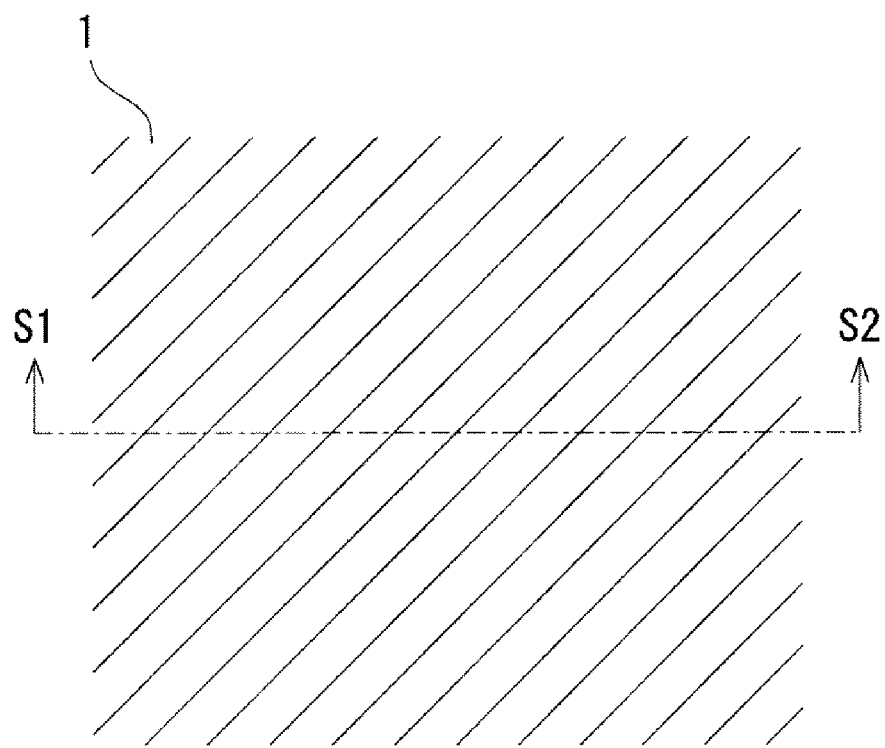
FIG. 5A is a plan view of the surface of the iron-based sintered body in an identification mark area before a first step.
Figure 5B:
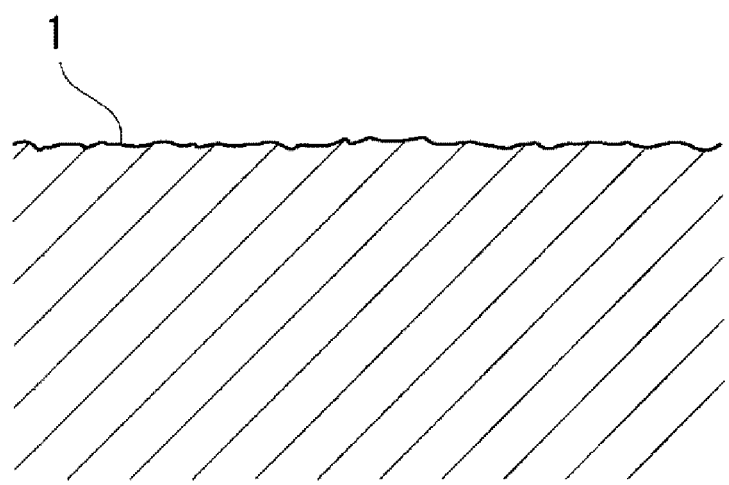
FIG. 5B is a cross-sectional view taken along line S1-S2 in FIG. 5A.
Figure 6A:
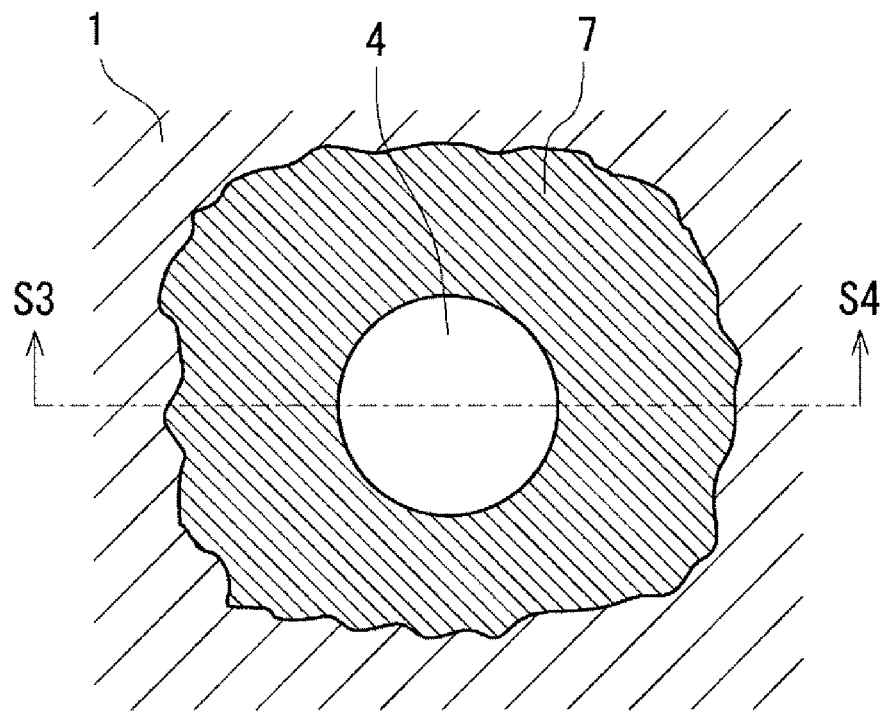
FIG. 6A is a plan view of the surface of an iron-based sintered body subjected to a first step on the surface illustrated in FIG. 5A.
Figure 6B:
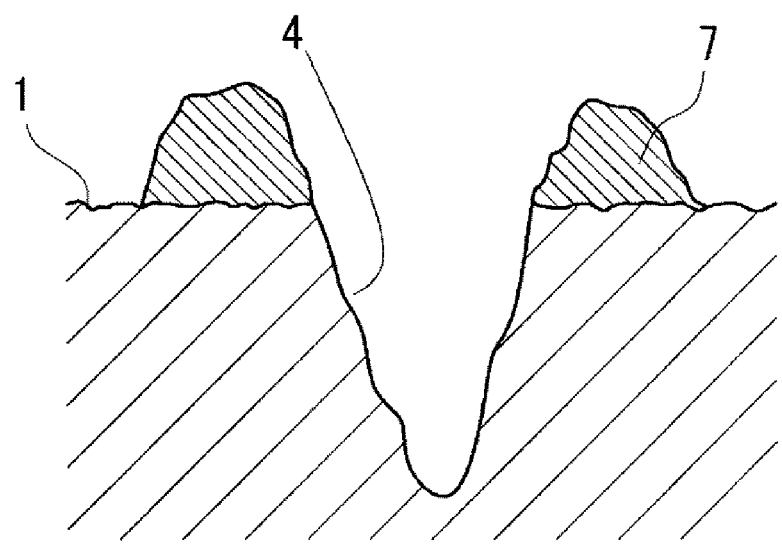
FIG. 6B is a cross-sectional view taken along line S3-S4 in FIG. 6A.

FIGS. 5A, 5B, 6A, 6B, 7A, and 7B are schematic diagrams illustrating an aspect of a laser-marking method according to an embodiment of the present disclosure. FIG. 5A is a plan view of the surface of an iron-based sintered body in the identification mark area 1 before the first step, and FIG. 5B is a cross-sectional view taken along line S1-S2 in FIG. 5A. FIG. 6A is a plan view of the surface of the iron-based sintered body obtained after the surface in FIG. 5A is subjected to the first step, and FIG. 6B is a cross-sectional view taken along line S3-S4 in FIG. 6A.

Figure 7A:
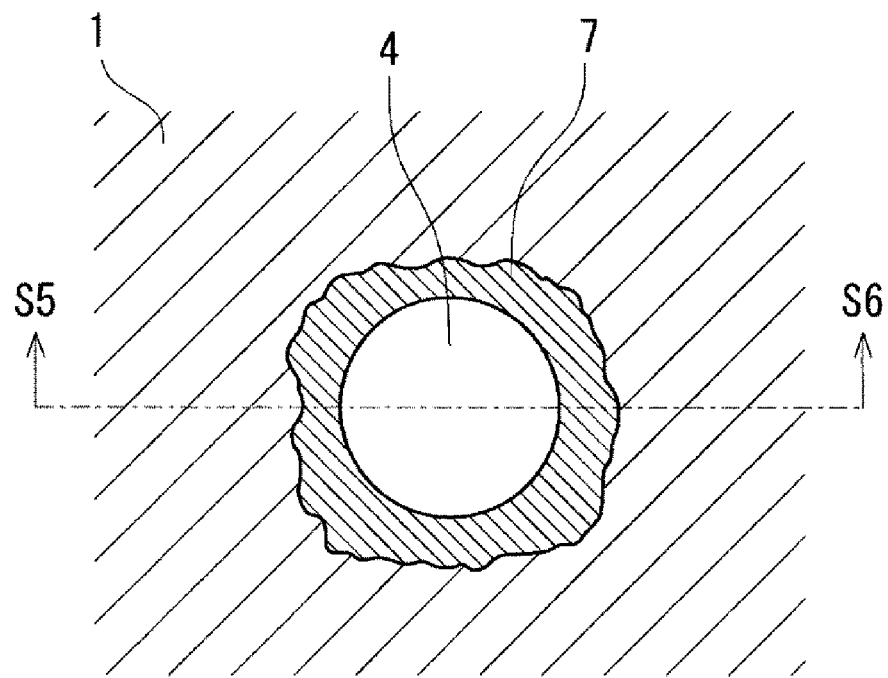
FIG. 7A is a plan view of the surface of an iron-based sintered body subjected to a second step on the surface illustrated in FIG. 6A.
Figure 7B:
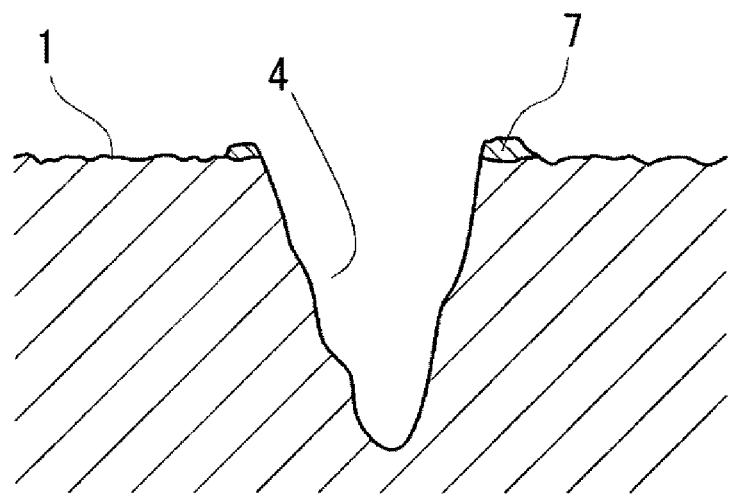
FIG. 7B is a cross-sectional view taken along line S5-S6 in FIG. 7A.

FIG. 7A is a plan view of the surface of the iron-based sintered body obtained after the surface in FIG. 6A is subjected to the second step, and FIG. 7B is a cross-sectional view taken along line S5-S6 in FIG. 7A.

With reference to FIG. 5A and FIG. 5B, the identification mark area 1 is a portion of the surface of the iron-based sintered body. Depending on the unevenness of the surface, the foundation treatment may be performed in advance with a laser beam. Laser processing conditions at that time are not particularly limited, but preferably, the conditions similar to those for the second laser beam described with reference to FIG. 4 are employed. In this case, a laser beam may be reciprocated linearly (in a stripe pattern) for scanning the entirety of the identification mark area 1.

With reference to FIG. 6A and FIG. 6B, in the first step, the recess 4 is formed in the identification mark area 1 on the surface of the iron-based sintered body with the first laser beam. At this time, volatile matter or debris peculiar to the iron-based sintered body produced during laser processing may redeposit on or readhere to accumulate at the outer periphery of the recess 4 to form a protrusion 7.

With reference to FIG. 7A and FIG. 7B, in the second step, the second laser beam is applied to scan the entirety of the identification mark area 1 to flatten the portion of the surface other than the recess 4. Here, the redeposits or readherents produced in the first step are removed to reduce the height of the protrusion 7.

At this time, an irradiation energy per unit area of the second laser beam is determined to be smaller than the irradiation energy per unit area of the first laser beam. Thus, the height of the protrusion 7 is reduced, and concurrently, the contrast between the dark portion in the recess and the light portion other than the recess becomes clearer to improve the code-reader legibility.

In the first step and the second step, preferable ranges of the irradiation energies per unit area of the first laser beam and the second laser beam are as follows. For example, the first laser beam preferably has an irradiation energy per unit area of greater than or equal to 1.0 $J/mm^2$ and smaller than or equal to 7.0 $J/mm^2$, and the second laser beam preferably has an irradiation energy per unit area of greater than or equal to 0.05 $J/mm^2$ and smaller than or equal to 0.50 $J/mm^2$.

The irradiation energy per unit area is defined with an average output per unit spot, a spot diameter, and a scanning speed (described above in Formula 2).

Preferable ranges for the related parameters are as follows to make the irradiation energy per unit area for the first and second laser beams to fall within preferable ranges.

The first laser beam has an average output per unit spot of greater than or equal to 20 W and smaller than or equal to 50 W, a spot diameter of greater than or equal to 0.010 mm and smaller than or equal to 0.060 mm, and a scanning speed of higher than or equal to 250 mm/s and lower than or equal to 320 mm/s.

The second laser beam has an average output per unit spot of greater than or equal to 10 W and smaller than or equal to 25 W, a spot diameter of greater than or equal to 0.010 mm and smaller than or equal to 0.060 mm, and a scanning speed of higher than or equal to 1700 mm/s and lower than or equal to 3000 mm/s.

[Definition of Depth of Dotted Recess and Height of Protrusion of Outer Periphery]

Figure 8A:
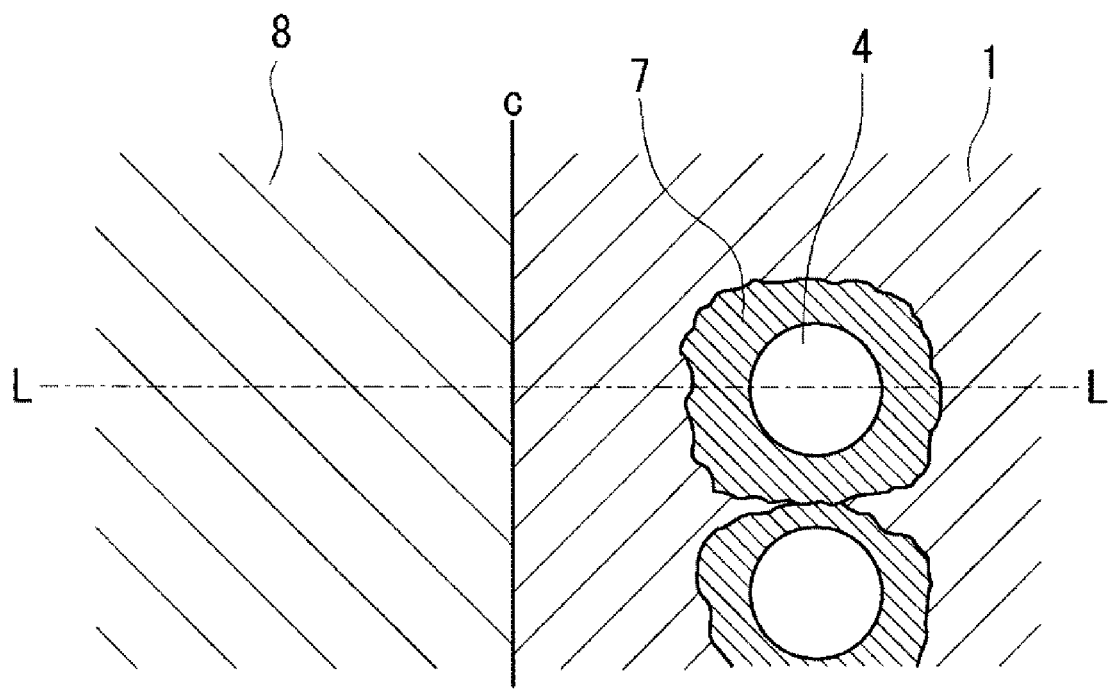
FIG. 8A is a plan view of the surface of an iron-based sintered body including an identification mark area, an outer peripheral portion of the area, and dotted recesses.
Figure 8B:
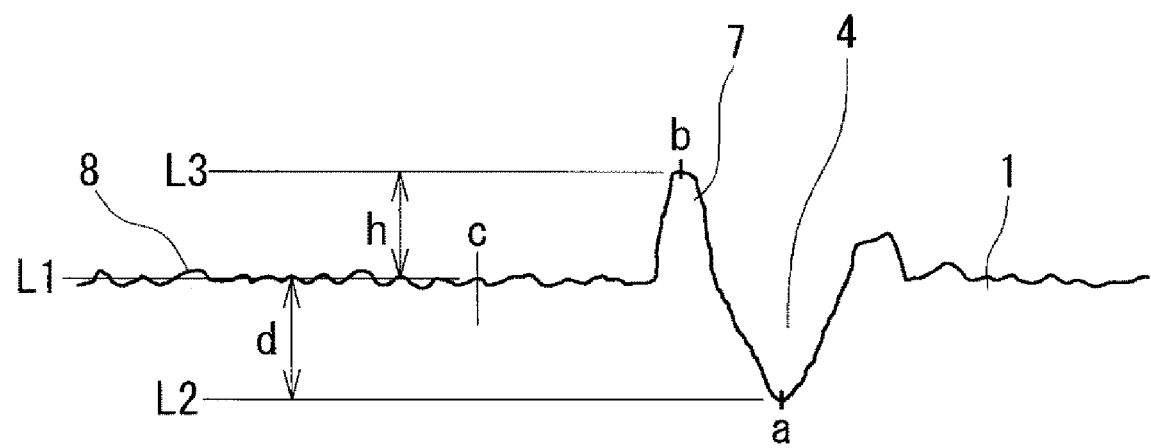
FIG. 8B illustrates an uneven profile of the surface of the dotted recesses and the peripheries of the recesses when taken along a straight line L in FIG. 8A.

FIG. 8A and FIG. 8B are schematic diagrams of the definition of the depth of each recess 4 and the height of each protrusion 7 of the outer periphery of the recess 4.

FIG. 8A is a plan view of the surface of the iron-based sintered body including the identification mark area 1, an outer peripheral portion 8, and the recess 4. FIG. 8B illustrates an uneven profile of the recess 4 and the surrounding surface taken along a straight line L in FIG. 8A.

With reference to FIG. 8A and FIG. 8B, a method for measuring the depth of each recess 4 and the height of each protrusion 7 will be described. A reference surface for measuring the depth of the recess 4 and the height of the protrusion 7 within the identification mark area 1 is a surface of the outer peripheral portion 8, forming the outer periphery of the identification mark area 1.

The uneven profile of the surface is measured along the straight line L, which passes through the center of an inscribed circle on the surface of the recess 4 within the identification mark area 1 and crosses a border c and the outer peripheral portion 8. To measurer the uneven profile of the surface, a three-dimensional profile measuring device capable of measuring a sample depending on the surface unevenness is appropriately selected from, for example, a commercially available microscope, a three-dimensional profile measuring device, a laser displacement meter, or a noncontact surface roughness meter.

With reference to FIG. 8B, the straight line L1 to which the uneven profile of the outer peripheral portion 8 is approximated by the method of least squares is used as a reference height. The length of the straight line L1 may be greater than or equal to the distance from the border c to the recess 4 closest to the border c and selected as a measurement target, and smaller than or equal to twice the distance. The depth d of the recess 4 is determined to be a distance between the straight line L1 and a straight line L2, which is in contact with a bottommost portion a of the recess and parallel to the straight line L1. The height h of the protrusion 7 is determined to be a distance between the straight line L1 and a straight line L3, which is in contact with a topmost portion b of the protrusion and parallel to the straight line L1.

In the first step and the second step, the recess 4 formed by the first laser beam preferably has a largest possible depth to have its darkness further outstand as a dark portion. On the other hand, the protrusion 7 flattened by the second laser beam has a smallest possible height to further outstand as a light portion.

The recess 4 of the iron-based sintered body according to the present embodiment thus measured preferably has a depth of greater than or equal to 70 μm and smaller than or equal to 200 μm, and the protrusion 7 preferably has a height of greater than or equal to 0 μm and smaller than or equal to 300 μm.

As schematically illustrated in plan views in FIGS. 6A, 7A, and 8A, the recess 4 preferably has its opening end with a substantially circular shape when viewed in a plan, but the opening end may have a polygonal shape such as a quadrangular shape. As schematically illustrated in the cross-sectional views in FIG. 6B and FIG. 7B and an uneven profile of the surface in FIG. 8B, the recess 4 preferably has a side wall having an opening diameter monotonously reducing toward the bottom. Thus, the recess 4 has a stable state as the dark portion.

[Another Aspect of Method for Forming Identification Mark in Steps of Manufacturing Iron-Based Sintered Body]

Figure 9:
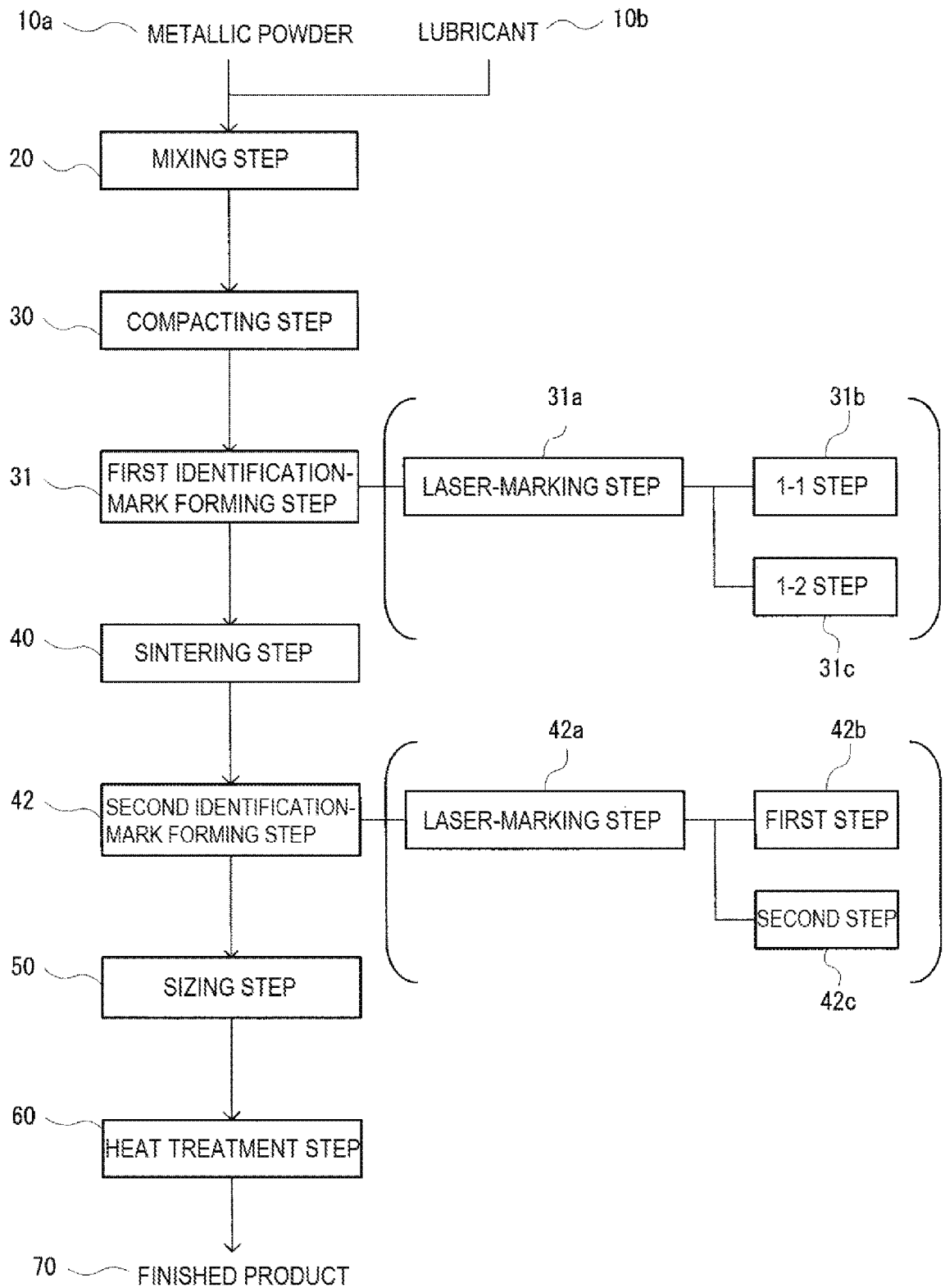
FIG. 9 is a flowchart of another aspect of a method for forming an identification mark in steps for manufacturing an iron-based sintered body.

FIG. 9 is a flowchart of another aspect of a method for forming an identification mark in steps of manufacturing an iron-based sintered body.

The flowchart in FIG. 9 differs from the flowchart in FIG. 1, in that an identification mark is formed not only after the sintering step 40 but also after the compacting step 30. The manufacturing steps are the same as those in FIG. 1 except for a first identification-mark forming step 31 and a second identification-mark forming step 42. The first identification-mark forming step 31 is a step of forming a first identification mark in a first area 9 of the surface of the compact obtained after the compacting step 30. Thereafter, a second identification mark is formed in a second area 10 of the surface of the sintered body obtained after the sintering step 40. The second identification-mark forming step 42 includes a laser marking step 42a according to an embodiment of the present disclosure, which includes a first step 42b and a second step 42c.

These steps are substantially the same as the laser marking step 41a, the first step 41b, and the second step 41c in FIG. 1. The first area 9 and the second area 10 may be located at the same position or different positions.

The way of forming a first identification mark in the first identification-mark forming step 31 is not limited to a particular one. For example, a paper-made adhesive sticker may be used as a two-dimensional code if the first identification mark is allowed to be lost after sintering. However, when the first identification mark is used after sintering, a laser-marking method that prevents degradation or deterioration of a mark obtained after sintering is preferably used. More preferably, the method for laser-marking an iron-based sintered body according to an embodiment of the present disclosure may be applied to a compact.

A more preferable embodiment of a laser marking step 31a in the first identification-mark forming step 31 will be described below.

The laser marking step 31a includes a 1-1 step 31b and a 1-2 step 31c. In the 1-1 step 31b, multiple dotted first recesses with a predetermined depth are formed in the first area 9 on the surface of the compact by a third laser beam. In the 1-2 step 31c, a portion of the surface in the first area 9 other than the first recesses is flattened by a fourth laser beam. The third laser beam has a larger irradiation energy per unit area than the fourth laser beam.

The 1-1 step 31b preferably includes a step of rotationally applying the third laser beam multiple times to the inside of a cell in the first area 9 from the outer side to the inner side in a circular or polygonal spiral form.

The third laser beam more preferably has an irradiation energy per unit area of greater than or equal to 1.0 $J/mm^2$ and smaller than or equal to 7.0 $J/mm^2$. The fourth laser beam more preferably has an irradiation energy per unit area of greater than or equal to 0.05 $J/mm^2$ and smaller than or equal to 0.50 $J/mm^2$.

The third laser beam preferably has an average output per unit spot of greater than or equal to 20 W and smaller than or equal to 50 W, a spot diameter of greater than or equal to 0.010 mm and smaller than or equal to 0.060 mm, and a scanning speed of higher than or equal to 250 mm/s and lower than or equal to 320 mm/s. The fourth laser beam has an average output per unit spot of greater than or equal to 10 W and smaller than or equal to 25 W, a spot diameter of greater than or equal to 0.010 mm and smaller than or equal to 0.060 mm, and a scanning speed of higher than or equal to 1700 mm/s and lower than or equal to 3000 mm/s.

Figure 10A:
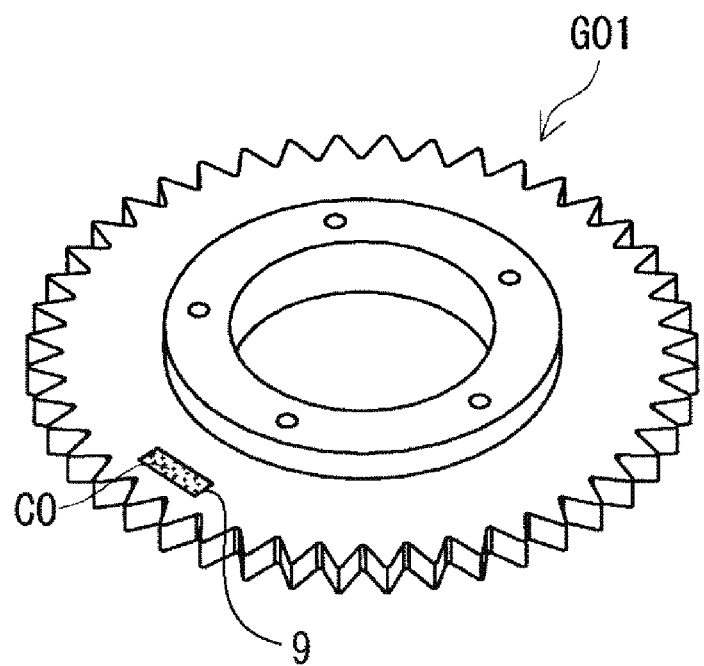
FIG. 10A is a perspective view of a compact having a first identification mark.

FIG. 10A is a perspective view of a compact having a first identification mark.

Figure 10B:
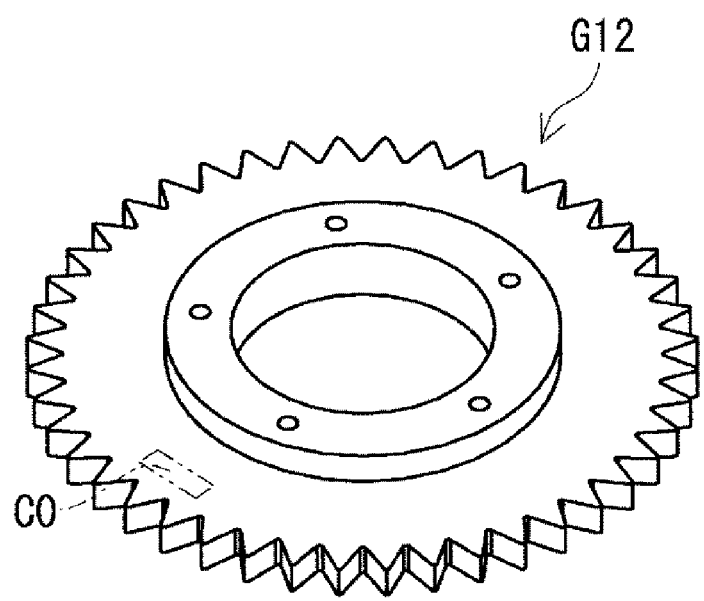
FIG. 10B is a perspective view of an iron-based sintered body having a first identification mark lost or blurred.

FIG. 10B is a perspective view of an iron-based sintered body having a first identification mark lost or blurred.

Figure 10C:
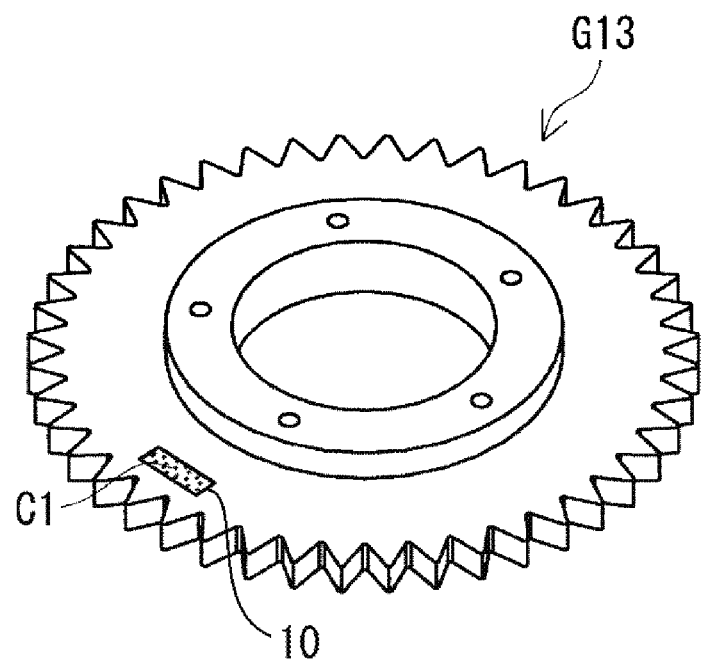
FIG. 10C is a perspective view of an iron-based sintered body having a second identification mark.

FIG. 10C is a perspective view of an iron-based sintered body having a second identification mark.

With reference to FIG. 10A, a compact G01 is a compact having a first identification mark C0, formed in the first identification-mark forming step 31 illustrated in FIG. 9. The compact G01 has a surface on which the first identification mark C0 can be formed.

With reference to FIG. 10B, an iron-based sintered body G12 is an iron-based sintered body having a first identification mark C0 lost or blurred after undergoing the sintering step 40 illustrated in FIG. 9.

With reference to FIG. 10C, an iron-based sintered body G13 is an iron-based sintered body having a second identification mark C1, formed in the second identification-mark forming step 42 illustrated in FIG. 9.

Examples of a method for providing or forming the identification mark C0 illustrated in FIG. 10A include bonding of an adhesive sticker, stamping with a stamp, and laser marking. Keeping the identification mark C0 without being lost after sintering while having an effective function is naturally effective for, for example, production management, quality management, and production history management from a semi-finished product (compact to sintered body) to a finished product. In this case, an additional identification mark for information included in the identification mark C0 is not required after sintering.

However, the identification mark C0 even formed by, for example, laser marking may become illegible by a code reader due to being lost or blurred to make the contract unclear depending on the sintering conditions over 1000° C. (FIG. 10B). Alternatively, an identification mark including historical information after sintering may be added in addition to the identification mark C0. In such a case, the second identification mark C1 needs to be additionally formed on the surface of a sintered body after sintering, and a method for laser-marking an iron-based sintered body according to an embodiment of the present disclosure will be effective.

When the second identification mark C1 including the contents the same as the lost first identification mark C0 or new information (relating to, for example, sintering step) is formed in the laser-marking method, the position at which the identification mark C1 is to be formed is determined as appropriate without being particularly restricted by the portion at which the identification mark C0 is formed. However, when the identification mark C0 is unclearly left without being completely lost or when the identification mark C0 and the identification mark C1 are to be left together for use, the identification mark C1 is formed at a position clearly distinguishable from the identification mark C0 so as not to be mixed with the identification mark C0.

[Evaluation of Code-Reader Legibility of Identification Mark Formed on Sintered Product]

Figure 11:
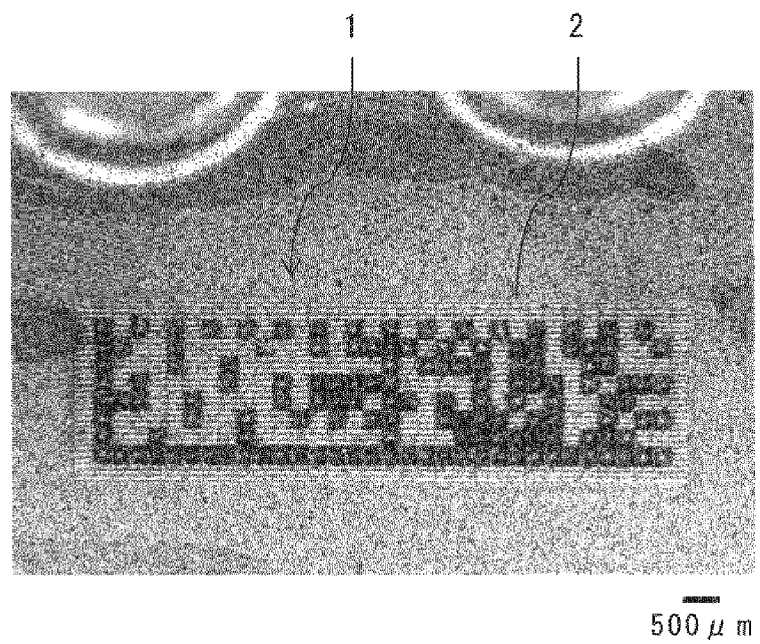
FIG. 11 is an enlarged photograph of an example of an identification mark formed on the surface of an iron-based sintered body.

FIG. 11 is an enlarged photograph of an example of an identification mark formed on the surface of the iron-based sintered body. In the identification mark area 1, black portions correspond to dark portions (dotted recesses formed inside the cell), which form a two-dimensional code 2. In this example, the dark portions are quadrangular dots formed by linearly, instead of spirally, reciprocating the first laser beam on the inside of the cell for scanning. Such a two-dimensional code can be read by a commercially available code reader (such as a bar-code reader or a QR code reader). However, depending on the laser processing conditions, the contrast between the dark portions and the light portions may become unclear. In such a case, the code reader may fail to read the code, for example, fail to respond without recognizing information of the two-dimensional code, display an error (fail to recognize the code), or recognize erroneous information (erroneously recognize the code).

The formed identification mark desirably has no failure in code-reader legibility any time, and has to be always stably and accurately read even when more products to be read are produced, that is, even when the number of products increases. The legibility is thus evaluated as being passed or not, based on whether a population on which the reading test is conducted includes zero legible errors (recognition failure or erroneous recognition). For example, when n pieces of the population correspond to 500 pieces, the method or conditions for forming the identification mark fails as being inappropriate if even one piece fails to be read in the reading test. The scale (the number of n) of the population for evaluation is determined in consideration of the quality level of the identification mark, the quantity of target productions, or the volume of a lot. The population normally includes 100 to 5000 pieces.

[Details of Steps of Manufacturing Iron-Based Sintered Body]

In the steps for manufacturing the iron-based sintered body illustrated in FIG. 1 and FIG. 9, the compacting step 30, the sintering step 40, the sizing step 50, and the heat treatment step 60 will be described in detail below.

(Compacting)

The compacting step 30 is a step of manufacturing a compact by compacting a material powder obtained by adding a lubricant 10b into a metallic powder 10a.

The compact is a sintered product, which is a semi-finished product, and formed into a shape corresponding to the sintered product.

Material Powder:

Examples of the material of the metallic powder 10a include an iron-based material. The iron-based material includes iron or a ferroalloy containing iron as a main component. Examples of a ferroalloy include a material containing at least one additional element selected from Ni, Cu, Cr, Mo, Mn, C, Si, Al, P, B, N, and Co.

Specific examples of a ferroalloy include stainless steel, a Fe—C-based alloy, a Fe—Cu—Ni—Mo-based alloy, a Fe—Ni—Mo—Mn-based alloy, a Fe—P-based alloy, a Fe—Cu-based alloy, a Fe—Cu—C-based alloy, a Fe—Cu—Mo-based alloy, a Fe—Ni—Mo—Cu—C-based alloy, a Fe—Ni—Cu-based alloy, a Fe—Ni—Mo—C-based alloy, a Fe—Ni—Cr-based alloy, a Fe—Ni—Mo—Cr-based alloy, a Fe—Cr-based alloy, a Fe—Mo—Cr-based alloy, a Fe—Cr—C-based alloy, a Fe—Ni—C-based alloy, and a Fe—Mo—Mn—Cr—C-based alloy.

The iron-based sintered body is obtained by using an iron-based material powder as a main component. When the iron-based material powder is used as a main component, the content of the iron-based material powder is, for example, greater than or equal to 90 mass %, or greater than or equal to 95 mass % when the material powder is 100 mass %.

When the iron-based sintered body contains an iron-based material powder, particularly, an iron powder as a main component, a metallic powder such as Cu, Ni, or Mo is preferably added as an alloy component.

Cu, Ni, or Mo is an element that improves hardenability. The content of Cu, Ni, or Mo is, for example, greater than 0 mass % and smaller than or equal to 5 mass %, or greater than 0.1 mass % and smaller than or equal to 2 mass % when the material powder is 100 mass %.

The material powder contains the above metallic powder as a main component, and is allowed to contain a small amount of inevitable impurities.

When the iron-based sintered body contains an iron-based material powder, particularly, an iron powder as a main component, a nonmetal inorganic material such as carbon (graphite) powder may be added. C is an element that enhances the strength of the sintered body or the heat-treated body.

The content of C is, for example, greater than 0 mass % and smaller than or equal to 2 mass %, or greater than or equal to 0.1 mass % and smaller than or equal to 1 mass %, when the material powder is 100 mass %.

The material powder preferably contains the lubricant 10b. The lubricant enhances the lubrication when the compact is to be press-formed, and improves formability. Here, a dense compact is more likely to be formed in compacting with a low pressure, and a highly-dense iron-based sintered body is more likely to be formed with enhancement of the density of the compact.

Examples of a lubricant include metallic soap such as zinc stearate or lithium stearate, fatty acid amide such as stearic acid amide, and higher fatty acid amide such as ethylene bis stearamide.

The lubricant 10b may be in any of solid, powder, and liquid forms. The content of a lubricant is, for example, smaller than or equal to 2 mass %, or smaller than or equal to 1 mass % when the material powder is 100 mass %. When the content of the lubricant is smaller than or equal to 2 mass %, the proportion of the metallic powder contained in the compact can be increased.

Thus, a dense compact can be more likely to be formed in compacting with a low pressure. Moreover, when a compact is sintered in a step subsequent to compacting, volume shrinkage due to disappearance of the lubricant can be prevented, so that a highly dense iron-based sintered body with highly accurate dimensions can be more likely to be obtained.

The content of the lubricant 10b is preferably greater than or equal to 0.1 mass %, or greater than or equal to 0.5 mass % from the viewpoint of obtaining an effect of lubrication improvement.

The material powder may contain an organic binder. However, the material powder of the compact according to the present embodiment preferably contains no organic binder.

The material powder not containing an organic binder can increase the proportion of a metallic powder in the compact. Thus, a dense compact can be more likely to be obtained in compacting with a low pressure. Moreover, the compact does not need to undergo degreasing in a subsequent step.

Examples usable as the above-described metallic powder include a water-atomized powder, a reduced powder, and a gas-atomized powder. Among these powders, a water-atomized powder or a reduced powder is preferable.

This is because, the water-atomized powder or the reduced powder has a large number of projections and depressions on the particle surfaces. Thus, the projections and depressions of the particles are engaged with each other during forming to enhance the shape retainability of the compact. Generally, a gas-atomized powder includes particles with a small number of projections and depressions on the surfaces, whereas a water-atomized powder or a reduced powder includes particles with a large number of projections and depressions on the surfaces.

The average particle diameter of a metallic powder is, for example, greater than or equal to 20 μm and smaller than or equal to 200 μm. The average particle diameter may be greater than or equal to 50 μm and smaller than or equal to 170 μm, or greater than or equal to 80 μm and smaller than or equal to 140 μm.

The average particle diameter of a metallic powder is a particle diameter where the cumulative mass in mass particle size distribution measured by a dry sieve analysis test in test sieving (JIS Z8815) is 50% (D50). When the average particle diameter of a metallic powder falls within the above range, the powder has high fluidity and is easily handleable and operable in compacting.

Compacting:

A compacting apparatus (compacting die assembly) capable of forming a material into a shape corresponding to a sintered product, which is a finished product, is used in the compacting step 30. The compact G01 (sprocket) illustrated in FIG. 10A by way of example includes a unit of all the portions integrated during forming.

The compacting apparatus (not illustrated) includes, for example, upper and lower punches, an inner die, inserted in the upper and lower punches to form an inner peripheral surface of a boss of the compact G01, and an outer die, surrounding the outer peripheries of the upper and lower punches and having an insertion hole for forming a gear of the compact G01.

Both end surfaces of the compact G01 in the axial direction are surfaces pressed by the upper and lower punches. The inner peripheral surface and the outer peripheral surface of the compact G01 are surfaces in slidable contact with the inner and outer dies. The applied pressure in compacting in the compacting step is, for example, higher than or equal to 400 MPa and lower than or equal to 1000 MPa.

(Sintering Step)

The sintering step 40 is a step of sintering a compact. In the sintering step, a sintering furnace (not illustrated) that can control the temperature atmosphere is used. As to the sintering conditions, conditions required for sintering may be determined as appropriate depending on, for example, the material of the compact.

Preferably, the sintering temperature is determined to be lower than or equal to the melting point of a main metallic powder (such as lower than or equal to 1400° C.), for example, higher than or equal to 1000° C. The sintering temperature may be higher than or equal to 1100° C., or higher than or equal to 1200° C.

The sintering time period is, for example, longer than or equal to 15 minutes and shorter than or equal to 150 minutes, or longer than or equal to 20 minutes and shorter than or equal to 60 minutes.

(Sizing)

The sizing step 50 is a step of compressing again a semi-finished material (sintered body) obtained after sintering the compact to enhance the dimensional accuracy of the sintered body.

A compacting device used for sizing is, for example, a turntable compacting device including a lower die on which the sintered body is installed by a robot arm or other devices, and an upper die that presses the installed sintered body from above.

The applied pressure in compacting for sizing differs depending on the types of a sintered product. For example, the applied pressure is higher than or equal to 250 MPa and lower than or equal to 800 MPa.

(Heat Treatment)

The heat treatment step 60 is a step of curing the surface of the sintered body with predetermined heat treatment on the sintered body obtained after sizing.

A heat treatment device used for the heat treatment step may be a continuous or batch heat treatment device. A batch heat treatment device includes, for example, a quenching furnace in which a sintered body is carburized and quenched, and a tempering furnace in which the quenched sintered body is tempered. A carburizing method of the heat treatment device may be any of gas carburizing, vacuum carburizing, and ion carburizing.

The steps for manufacturing an iron-based sintered body illustrated in FIG. 1 and FIG. 9 may also include other steps, for example, a step of performing a predetermined cutting or boring process on a sintered body after undergoing sizing and before undergoing heat treatment and a step of performing surface treatment on the sintered body undergoing heat treatment.

EXAMPLE

Examples of manufacturing steps are described using a sprocket as an example of the sintered product.

Example I

A material powder obtained by adding 0.5 parts by mass of a lubricant (zinc stearate) to 100 parts by mass of a metallic powder with a composition of 2 mass % of Fe, 0.8 mass % of Cu, and C is press-formed into a product shape by a compacting apparatus at an applied pressure of 500 MPa to obtain a compact. Then, the compact is processed in the sintering furnace at a sintering temperature of 1100° C. for a sintering time period of 30 minutes to obtain an iron-based sintered body.

The surface of the obtained iron-based sintered body was laser-marked to form a two-dimensional code including multiple dotted recesses in an identification mark area using a laser-marker device (FAYb laser marker MP-M500, pulse laser type, manufactured by Panasonic). Table 1 shows the laser marking conditions after a sintering step and characteristic evaluation results for the identification mark for each sample numbers.

TABLE 1

| | Laser Marking Conditions After Sintering Step | | | | | | | |
|---|---|---|---|---|---|---|---|---|
| | First Step/First Laser Beam | | | | | Second Step/Second Laser Beam | | |
| Sample No. | Average Output p1 (W) | Spot Diameter r1 (mm) | Scanning Speed s1 (mm/s) | Irradiation Time (t1 = 1/r1 × s1) (s/mm$^2$) | Irradiation Energy (e1 = p1 × t1) (J/mm$^2$) | Average Output p2 (W) | Spot Diameter r2 (mm) | Scanning Speed s2 (mm/s) |
| I-1 | 22 | 0.060 | 320 | 0.052 | 1.15 | 10 | 0.060 | 3000 |
| I-2 | 22 | 0.030 | 280 | 0.119 | 2.62 | 17 | 0.030 | 2450 |
| I-3 | 34 | 0.030 | 280 | 0.119 | 4.05 | 17 | 0.030 | 2450 |
| I-4 | 34 | 0.030 | 280 | 0.119 | 4.05 | 22 | 0.030 | 2450 |
| I-5 | 45 | 0.030 | 280 | 0.119 | 5.36 | 22 | 0.030 | 2450 |
| I-6 | 34 | 0.030 | 200 | 0.167 | 5.67 | 17 | 0.030 | 1500 |
| I-7 | 34 | 0.060 | 350 | 0.048 | 1.62 | 17 | 0.060 | 2800 |
| I-8 | 48 | 0.030 | 250 | 0.133 | 6.40 | 25 | 0.030 | 1700 |
| I-9 | 60 | 0.030 | 200 | 0.167 | 10.00 | 8 | 0.080 | 3400 |
| I-10 | 15 | 0.060 | 320 | 0.052 | 0.78 | 50 | 0.030 | 1700 |
| I-11 | 25 | 0.060 | 330 | 0.051 | 1.26 | 60 | 0.020 | 1700 |
| I-12 | 25 | 0.080 | 280 | 0.045 | 1.12 | 30 | 0.015 | 1500 |

TABLE 1-continued

| | Laser Marking Conditions After Sintering Step | | Characteristic Evaluation for Identification Mark of Iron-based Sintered Body | | | |
|---|---|---|---|---|---|---|
| | Second Step/Second Laser Beam | | Depth of Dotted Recess | | Protrusion Height at Outer Periphery of Recess | |
| | Irradiation Time | Irradiation Energy | | | | |
| Sample No. | (t2 = 1/r2 × s2) (s/mm$^2$) | (e2 = p2 × t2) (J/mm$^2$) | Maximum Value (μm) | Minimum Value (μm) | Maximum Value (μm) | Code-Reader Legibility |
| I-1 | 0.006 | 0.06 | 82 | 78 | 108 | Passed |
| I-2 | 0.014 | 0.23 | 131 | 120 | 85 | Passed |
| I-3 | 0.014 | 0.23 | 148 | 136 | 97 | Passed |
| I-4 | 0.014 | 0.30 | 150 | 140 | 105 | Passed |
| I-5 | 0.014 | 0.30 | 176 | 165 | 115 | Passed |
| I-6 | 0.022 | 0.38 | 182 | 171 | 120 | Passed |
| I-7 | 0.006 | 0.10 | 125 | 112 | 101 | Passed |
| I-8 | 0.020 | 0.49 | 188 | 165 | 136 | Passed |
| I-9 | 0.004 | 0.03 | 200 | 186 | 290 | Passed |
| I-10 | 0.020 | 0.98 | 45 | 38 | 80 | Failed |
| I-11 | 0.029 | 1.76 | 102 | 87 | 95 | Failed |
| I-12 | 0.044 | 1.33 | 90 | 76 | 73 | Failed |

The average outputs (p1 and p2 in Table 1), the spot diameters (r1 and r2 in Table 1), and the scanning speeds (s1 and s2 in Table 1) of laser beams were set to the values described in "Laser Marking Conditions After Sintering Step" for samples Nos. I-1 to I-12 shown in Table 1, and the first step and the second step were performed based on the irradiation energies per unit area (e1 and e2 in Table 1) of the first laser beam and the second laser beam derived from these conditions.

Here, as described above, the average output is obtained by multiplying a pulse energy (J) with a repetition frequency (I/s). Thus, the repetition frequency was fixed to 50 kHz in the first step, and fixed to 100 kHz in the second step, and the pulse energy was changed depending on the sample Nos. to set the average output shown in Table 1.

The number n of the sample Nos. was determined to be 500 products for each set of the same laser marking conditions, and an identification mark having predetermined information was formed at one position for each product. The depth of the dotted recess after marking and the protrusion height at the outer periphery of the recess were measured using a three-dimensional profile measuring device (KEYENCE VR-3000) with a method described with FIG. 8A and FIG. 8B taken as an example in the details of the embodiment of the present disclosure. As to the number of measured pieces, three pieces were randomly selected from the 500 products for each sample No., and dotted recesses at three points were selected at random from the identification marks in each product. From among the nine measurement points thus obtained in total, the minimum value and the maximum value of the dotted recesses and the maximum value of the protrusion height at the outer periphery of the recess are shown as the measurement values for the sample No. in Table 1.

Dataman 362X manufactured by COGNEX was used as a code reader to evaluate the legibility of the identification mark formed on the iron-based sintered body. The code reader read two-dimensional codes formed on 500 products for each sample No., and determined a sample No. that includes zero reading failure (recognition failure or erroneous recognition) as "passed", and a sample No. that includes one or more reading failures as "failed".

With reference to Table 1, the sample Nos. I-1 to I-9 are examples and the sample Nos. I-10 to I-12 are comparative examples. In the sample Nos. I-1 to I-9, the irradiation energy e1 per unit area of the first laser beam is greater than the irradiation energy e2 per unit area of the second laser beam (e1>e2). On the other hand, the sample Nos. I-10 to I-12 have the opposite relationship (e1<e2). As to code-reader legibility, the samples I-1 to I-9 where e1>e2 "passed", whereas the sample Nos. I-10 to I-12 "failed".

The sample No. I-10 where the average output of the first laser beam is smaller than 20 W (15 W) and the average output of the second laser beam is greater than 25 W (50 W) had the dotted recesses having a depth of 45 μm at maximum, which is smaller than 70 μm, and had an unclear contrast for dark portions, and thus caused a large number of code-reader reading failures (and thus "failed").

The sample I-9 where the irradiation energy e1 of the first laser beam is higher than 7.0 J/mm$^2$ (10.0 J/mm$^2$), and the irradiation energy e2 of the second laser beam is lower than 0.05 J/mm$^2$ (0.03 J/mm$^2$) had a legibility evaluation result of "passed". The sample I-9 had a certain effect compared to comparative examples, but had lower stability than other examples (I-1 to I-8), and caused a reading failure in evaluation of another manufacturing lot.

The sample No. I-11 has dotted recesses with a depth of 102 μm at maximum, and 87 μm at minimum, and protrusions at the outer peripheries of the recesses with a height of 95 μm at maximum, which fall within preferable ranges. However, the sample No. I-11 was "failed" in code-reader legibility. This is probably because the contrast is unclear with the irradiation energy e2 of the second laser beam of 1.76 J/mm$^2$, which is far higher than 0.50 J/mm$^2$, so that the portion of the surface other than the dotted recesses is blackened.

Example II

A material powder the same as that for the example I was press-formed into a product with a compacting apparatus at an applied pressure of 500 MPa. Thereafter, the surface of the obtained compact was laser-marked with a first identification mark (including a two-dimensional code including multiple dotted first recesses) using a laser-marker device (FAYb laser marker MP-M500 manufactured by Panasonic) under the conditions shown in Table 2. After the first identification mark of the formed compact was evaluated in terms of code-reader legibility, the compact was treated in a sintering furnace at a sintering temperature of 1100° C. for a sintering time period of 30 minutes. Then, as in the example I, a second identification mark was formed on the surface of the obtained iron-based sintered body with the laser-marker device. The laser marking conditions of the second identification mark were the same as those for the sample No. I-4 in Table 1 in example I for all the samples in Table 2. Thereafter, the first identification mark and the second identification mark of the iron-based sintered body after sintering were evaluated in terms of code-reader legibility with the method and for the number n the same as those for the example I for each sample.

Table 2 shows the evaluation results of the laser marking conditions of the first identification mark and the code-reader legibility for each sample.

In either case, the second identification mark is formed after the first identification mark is formed to leave the first identification mark and the second identification mark together, so that the options of manageable information can be increased. Even when the first identification mark is failed during manufacturing steps, or lost or blurred after sintering, the identification mark required for the iron-based sintered body can be secured by the second identification mark.

The above-described embodiments and examples are naturally regarded as mere examples in all respects, and not limitative. The scope of the present disclosure is shown by the scope of claims instead of the above description, and intended to include the scope of claims, equivalents thereof, and all the modifications within the scope.

TABLE 2

| | Laser Marking Conditions for First Identification Mark | | | | | | |
|---|---|---|---|---|---|---|---|
| | 1-1 Step/Third Laser Beam | | | | | 1-2 Step/Fourth Laser Beam | |
| Sample No. | Average Output p1 (W) | Spot Diameter r1 (mm) | Scanning Speed s1 (mm/s) | Irradiation Time (t1 = 1/r1 × s1) (s/mm²) | Irradiation Energy (e1 = p1 × t1) (J/mm²) | Average Output p2 (W) | Spot Diameter r2 (mm) |
| II-1 | 34 | 0.030 | 280 | 0.119 | 4.05 | 22 | 0.030 |
| II-2 | 48 | 0.030 | 250 | 0.133 | 6.40 | 25 | 0.030 |
| II-3 | 60 | 0.030 | 200 | 0.167 | 10.00 | 10 | 0.080 |
| II-4 | 15 | 0.060 | 500 | 0.033 | 0.50 | 27 | 0.030 |
| II-5 | 60 | 0.030 | 280 | 0.119 | 7.14 | — | — |
| II-6 | 5 | 0.080 | 800 | 0.016 | 0.08 | 8 | 0.015 |

| | Laser Marking Conditions for First Identification Mark | | | Code-Reader Legibility | | |
|---|---|---|---|---|---|---|
| | 1-2 Step/Fourth Laser Beam | | | First Identification Mark | Second Identification Mark | |
| Sample No. | Scanning Speed s2 (mm/s) | Irradiation Time (t2 = 1/r2 × s2) (s/mm²) | Irradiation Energy (e2 = p2 × t2) (J/mm²) | After Forming | After Sintering | After Sintering |
| II-1 | 2450 | 0.014 | 0.30 | Passed | Passed | Passed |
| II-2 | 1700 | 0.020 | 0.49 | Passed | Passed | Passed |
| II-3 | 3400 | 0.004 | 0.04 | Passed | Passed | Passed |
| II-4 | 1700 | 0.020 | 0.53 | Passed | Failed | Passed |
| II-5 | — | — | — | Failed | Failed | Passed |
| II-6 | 3400 | 0.020 | 0.16 | Failed | Failed | Passed |

As to the first identification mark, the repetition frequency of a pulse laser was fixed to 50 kHz in the 1-1 step, and fixed to 100 kHz in the 1-2 step, and the pulse energy was changed depending on the sample Nos. to set the average outputs p1 and p2 shown in "laser marking conditions after forming" for the sample Nos. II-1 to II-6 in Table 2. The 1-1 step and the 1-2 step were performed by setting the spot diameters r1 and r2 and the scanning speeds s1 and s2 of the laser beams and based on the irradiation energies e1 and e2 per unit area for a third laser beam and a fourth laser beam derived from these parameters (1-2 step was not performed for the sample No. II-5).

With reference to Table 2, the sample Nos. II-1 to II-3 are cases where the first identification mark and the second identification mark are left also after sintering. The sample No. II-4 is a case where the first identification mark on the compact was preferable, but lost or blurred after sintering to become illegible, and only the second identification mark on the sintered body functions. The sample Nos. II-5 and II-6 are cases where the first identification mark on the compact is "failed" in legibility without functioning.

REFERENCE SIGNS LIST 1 area
2 two-dimensional code
3 cell
4 recess
5, 6 scanning track
7 protrusion
8 outer peripheral portion
9 first area
10 second area
a bottommost portion of recess
b topmost portion of protrusion
c border
d depth of recess
h height of protrusion
H height
W width
L, L1, L2, L3 straight line
C0, C1 identification mark
G01 compact
G10, G11, G12, G13 iron-based sintered body

The invention claimed is:

1. A method for laser-marking an iron-based sintered body, the method comprising:
   a first step of forming a plurality of dotted recesses with a predetermined depth in an identification mark area of a surface of an iron-based sintered body with a first laser beam; and
   a second step of flattening the surface within the identification mark area other than the dotted recesses with a second laser beam,
   wherein the first laser beam has an irradiation energy per unit area greater than an irradiation energy per unit area of the second laser beam, and
   wherein the first step includes a step of rotationally applying a plurality of times the first laser beam to an inside of a cell, which is a part of the identification mark area, from an outer side of the cell to an inner side of the cell in a circular or polygonal spiral form.

2. The method for laser-marking an iron-based sintered body according to claim 1,
   wherein the first laser beam has an irradiation energy per unit area of greater than or equal to 1.0 $J/mm^2$ and smaller than or equal to 7.0 $J/mm^2$, and
   wherein the second laser beam has an irradiation energy per unit area of greater than or equal to 0.05 $J/mm^2$ and smaller than or equal to 0.50 $J/mm^2$.

3. The method for laser-marking an iron-based sintered body according to claim 1,
   wherein the first laser beam has an average output per unit spot of greater than or equal to 20 W and smaller than or equal to 50 W, a spot diameter of greater than or equal to 0.010 mm and smaller than or equal to 0.060 mm, and a scanning speed of higher than or equal to 250 mm/s and lower than or equal to 320 mm/s, and
   wherein the second laser beam has an average output per unit spot of greater than or equal to 10 W and smaller than or equal to 25 W, a spot diameter of greater than or equal to 0.010 mm and smaller than or equal to 0.060 mm, and a scanning speed of higher than or equal to 1700 mm/s and lower than or equal to 3000 mm/s.

4. A method for manufacturing an iron-based sintered body, comprising:
   a step of forming a first identification mark in a first area of a surface of a compact; and
   a step of forming a second identification mark in a second area of a surface of a sintered body obtained by sintering the compact,
   wherein the second identification mark is formed by the laser-marking method according to claim 1.

5. The method for manufacturing an iron-based sintered body according to claim 4,
   wherein a method for forming the first identification mark is a laser-marking method.

6. The method for manufacturing an iron-based sintered body according to claim 4,
   wherein the method for forming the first identification mark includes
      a 1-1 step of forming, with a third laser beam, a plurality of dotted first recesses with a predetermined depth in the first area of the surface of the compact, and
      a 1-2 step of flattening, with a fourth laser beam, the surface within the first area other than the dotted first recesses, and
   wherein an irradiation energy per unit area of the third laser beam is greater than an irradiation energy per unit area of the fourth laser beam.

* * * * *